US011321759B2

(12) United States Patent
Adams et al.

(10) Patent No.: US 11,321,759 B2
(45) Date of Patent: May 3, 2022

(54) METHOD, COMPUTER PROGRAM PRODUCT AND SYSTEM FOR ENABLING PERSONALIZED RECOMMENDATIONS USING INTELLIGENT DIALOG

(71) Applicant: INTERNATIONAL BUSINESS MACHINES CORPORATION, Armonk, NY (US)

(72) Inventors: Trevor S. Adams, Ventura, CA (US); Chaitanya Bilgikar, San Francisco, CA (US); Andrew Guldman, Truckee, CA (US); Andrew J. Kerr, Ottawa (CA); Ridhima Mahajan, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 15/635,556

(22) Filed: Jun. 28, 2017

(65) Prior Publication Data

US 2018/0005293 A1 Jan. 4, 2018

Related U.S. Application Data

(60) Provisional application No. 62/356,921, filed on Jun. 30, 2016.

(51) Int. Cl.
*G06Q 30/06* (2012.01)
*G06F 16/903* (2019.01)

(52) U.S. Cl.
CPC ........... *G06Q 30/0625* (2013.01); *G06F 16/90335* (2019.01); *G06Q 30/0631* (2013.01)

(58) Field of Classification Search
CPC ...................... G06Q 30/0601–0645
(Continued)

(56) References Cited

U.S. PATENT DOCUMENTS

| 10,528,564 B2 * | 1/2020 | Behzadi ............. G06F 16/2455 |
| 2011/0125783 A1 * | 5/2011 | Whale .................. G06F 16/435 |
| | | 707/769 |

(Continued)

OTHER PUBLICATIONS

Koivumaki, T., Svento, R., Perttunen, J., & Oinas-Kukkonen, H. (2002). Consumer choice behavior and electronic shopping systems—A theoretical note. Netnomics : Economic Research and Electronic Networking, 4(2), 131. Retrieved from https://dialog.proquest.com (Year: 2002).*

(Continued)

*Primary Examiner* — Allison G Wood
*Assistant Examiner* — Ashley D Preston
(74) *Attorney, Agent, or Firm* — Brian Restuaro; Andrew D. Wright; Roberts Calderon Safran & Cole, P.C.

(57) ABSTRACT

Systems and methods for providing a recommendation are disclosed. A method includes: presenting a first question via a user interface; receiving a response to the first question via the user interface; determining a second question using the received response to the first question and a weighted collection of attributes corresponding to a plurality of items; presenting the determined second question via the user interface; receiving a response to the second question via the user interface; determining at least one recommended item from the plurality of items based on the response to the first question, the response to the second question, and the weighted collection of attributes corresponding to the plurality of items; and presenting the determined at least one recommended item via the user interface.

20 Claims, 21 Drawing Sheets

(58) Field of Classification Search
USPC .............................................. 705/26.1–27.2
See application file for complete search history.

(56) References Cited

U.S. PATENT DOCUMENTS

2014/0180790 A1\* 6/2014 Boal .................. G06Q 30/0211
705/14.42
2015/0120493 A1\* 4/2015 Mokshagundam ..........................
G06Q 30/0631
705/26.7

OTHER PUBLICATIONS

Mell et al., "The NIST Definition of Cloud Computing", NIST, Special Publication 800-145, Sep. 2011, 7 pages.
"IBM's Watson steps out again (with Fluid XPS)", https://www.fluid.com/news/ibms-watson-steps-out-again-with-fluid-xps, Fluid, Mar. 14, 2014, 3 pages.
"The North Face, IBM and Fluid Launch New Interactive Shopping Experience", https://www.fluid.com/news/the-north-face-ibm-and-fluid-launch-new-interactive-shopping-experience-using-artificial-intelligence-ai, Fluid, Dec. 13, 2015, 6 pages.
"IBM Watson Group Invests in Fluid to Transform the Consumer Shopping Experience", https://www-03.ibm.com/press/us/en/pressrelease/43722.wss, IBM, Apr. 22, 2014, 6 pages.

\* cited by examiner

METHOD, COMPUTER PROGRAM PRODUCT AND SYSTEM FOR ENABLING PERSONALIZED RECOMMENDATIONS USING INTELLIGENT DIALOG

BACKGROUND

The present invention generally relates to search technology and, more particularly, to a system and method for providing product recommendations.

Internet and e-commerce technologies have changed the ways that consumers search for and purchase products. As a result, companies managing consumer products brands can offer large catalogs of products online, which can be found through search engines that search web page content, including product data and metadata, to retrieve lists of products that may satisfy elements of a query, such as based on matching of keywords in a query to product descriptions stored in a database. When a consumer already knows exactly what product is being sought, such as based on an exact name, model number, or the like, such technologies can allow a consumer to find relevant products much more efficiently than was possible before. However, when a consumer does not yet know what product is being sought, challenges remain in identifying relevant information for the consumer without providing large amounts of irrelevant information. Technologies like collaborative filtering allow brands to target advertising and search results to some extent based on demographic, psychographic, and geographic characteristics of a given consumer, such as based on measures of similarity between the consumer and other parties that have searched for, shopped for, or purchased particular products. However, such technologies typically return very large numbers of results that are only loosely targeted to a consumer. Often a shopping consumer must filter through dozens, hundreds, or even thousands of irrelevant results, form new queries, or otherwise waste time in order to arrive at the potentially relevant products that might fill a need for which the consumer is shopping.

Artificial intelligence technologies are emerging that improve the ability of computer-based systems to manage communications with consumers and simulate interactions of real human beings. Such systems can typically process content within unstructured queries for keywords and return relevant information, such as finding a phone number for a nearby store of a given name, providing a weather report, or the like. However, such systems quickly fail when presented with the challenge of maintaining a sustained dialog, such as one would have with a salesperson in a retail store when trying to identify products that might meet a given need. A need exists for intelligent systems that can manage an authentic dialog with a customer that results in a relevant, personalized product recommendation that meets the customer's needs.

SUMMARY

In a first aspect of the invention, there is a method that includes: presenting, by a computer device, a first question via a user interface; receiving, by the computer device, a response to the first question via the user interface; determining, by the computer device, a second question using the received response to the first question and a weighted collection of attributes corresponding to a plurality of items; presenting, by the computer device, the determined second question via the user interface; receiving, by the computer device, a response to the second question via the user interface; determining, by the computer device, at least one recommended item from the plurality of items based on the response to the first question, the response to the second question, and the weighted collection of attributes corresponding to the plurality of items; and presenting, by the computer device, the determined at least one recommended item via the user interface.

In another aspect of the invention, there is a computer program product that includes a computer readable storage medium having program instructions embodied therewith. The program instructions are executable by a computer device to cause the computer device to: divide a weighted collection of attributes into a plurality of attribute groups; present, via a user interface, a first question; receive, via the user interface, a response to the first question; determine a confidence score for each of a plurality of items based on the received response to the first question and the weighted collection of attributes; determine an attribute group score for each of the plurality of attribute groups based on a degree to which receiving additional information regarding the attribute group increases the confidence score for at least one of the plurality of items; determine a subsequent question using the determined attribute group score for each of the plurality of attribute groups; and present, via the user interface, the determined subsequent question.

In another aspect of the invention, there is a system that includes: a hardware processor, a computer readable memory, and a computer readable storage medium associated with a computer device; program instructions of a divider configured to divide a weighted collection of attributes into a plurality of attribute groups; program instructions of a first question presenter configured to present, via a user interface, a first question; program instructions of a first response receiver configured to receive, via the user interface, a response to the first question presented by the first question presenter; program instructions of a confidence score determiner configured to determine a confidence score for each of a plurality of items based on the response to the first question received by the first response receiver and the weighted collection of attributes; program instructions of an attribute group score determiner configured to determine an attribute group score for each of the plurality of attribute groups based on a degree to which receiving additional information regarding the attribute group increases the confidence score for at least one of the plurality of items; program instructions of a subsequent question determiner configured to determine a subsequent question using the score for each of the plurality of attribute groups determined by the attribute group score determiner; and program instructions of a subsequent question presenter configured to present, via the user interface, the determined subsequent question, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 11 shows an embodiment in which there is additional dialog in the dialog box, resulting in additional processing by the platform, portions of which are reflected in the server logs.

FIG. 12 shows an embodiment in which dialog continues in the dialog box, with the best matching products shown in the product pane, updated based on the dialog steps undertaken at this point in the dialog.

Figure 17:
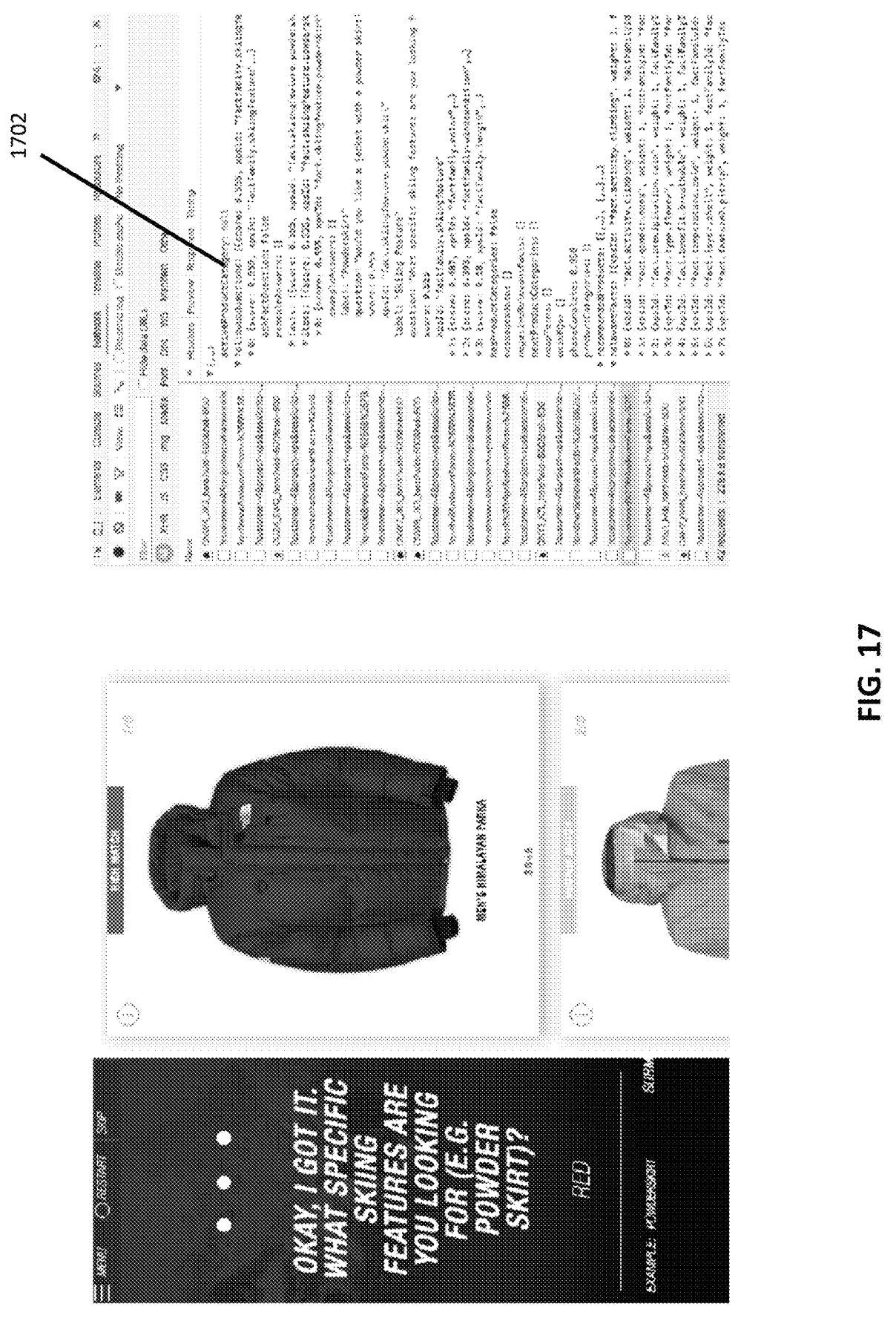

FIGS. 13, 14, 15, 16, 17, and 18 show an embodiment in which the dialog progresses through a series of product recommendations generated by the graph database using forward chaining logic and a series of questions generated using backward chaining logic, until a specific product recommendation is determined.

DETAILED DESCRIPTION

Figure 1:
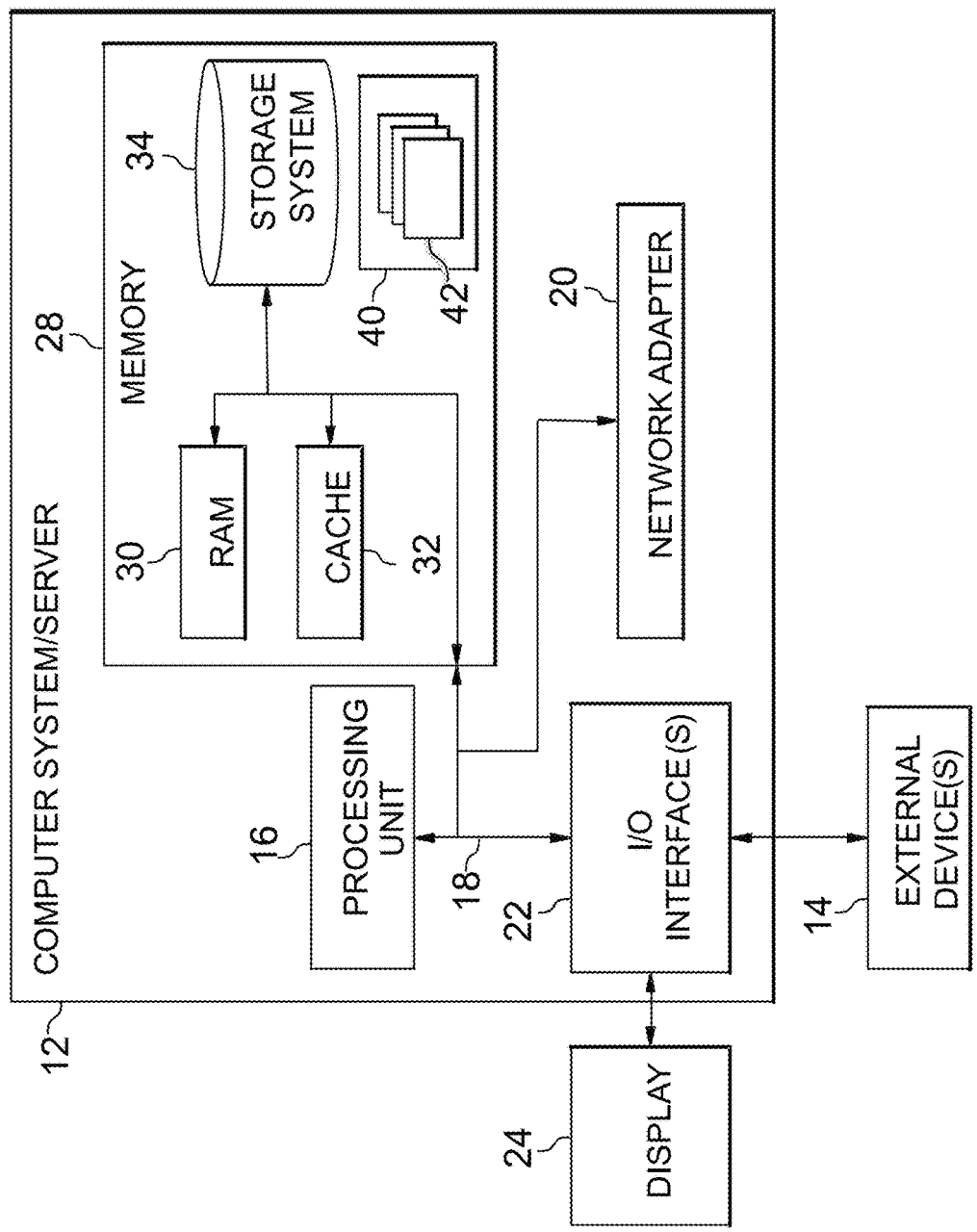
FIG. 1 depicts a cloud computing node according to an embodiment of the present invention.

The present invention generally relates to search technology and, more particularly, to a system and method for providing product recommendations.

Aspects of the invention are directed to a platform, with various components, methods, systems, services, modules and the like, that enables a company managing a product line, such as having one or more branded consumer products, to enable each of its consumers to engage in a dialog, managed by computer-implemented artificial intelligence, that results in a relevant, personalized product recommendation that meets the needs of the consumer. The dialog may simulate an interaction with a live salesperson, including allowing the customer to enter unstructured responses to a series of queries, where the queries are automatically generated.

In embodiments, the methods and systems disclosed herein may remove the need to main a large decision tree (e.g., of infinite or millions of possibilities) in order to work toward a product recommendation for a product that could be one of a very large number of products that could respond to a user's needs. The system may use forward chaining logic to surface product recommendations and backward chaining logic to surface follow-up questions in order to drive an automated dialog with a consumer until a product recommendation is reached.

According to an embodiment, methods and systems may use a graph database technology to provide product recommendations through a heat sink algorithm and also to drive a dialog to figure out what the next interesting topic would be in a dialog session. The graph database may be used in an inference-based product finder, such as one that can be hosted at a merchant's e-commerce site to help consumers find relevant products.

In embodiments, a consumer can enter unstructured information, such as "I'm going skiing and want a jacket," in an example where the customer is at a jacket provider's e-commerce site. The system can use inferential logic to determine various facts that relate, based on weights of edges in a graph database, to the consumer's information. Weights can be determined for various inferences, such as "skiing," "cold," and "windy," each corresponding to facts that may have relevance to a consumer's needs and to the products organized in the graph database. Products that have strong inferences to multiple facts (which accumulate over time) can be presented. The graph database can traverse edges for related facts to each of the products in the graph database, returning the ones that have greatest "heat," or strong inferences to multiple facts.

According to an embodiment, as dialog continues, it may be desirable to determine follow-up questions, which may be accomplished by using backward chaining logic. Continuing down through the results, follow-up questions may be determined. Based on known facts (including edge weights between products and various facts), the platform may determine what the next thing is that should be asked, such as a question about gender. In embodiments, the platform may identify unknown facts and, for each one of them, determines the extent to which, if known, the fact would impact product recommendations. In embodiments, this may be quantified based on the increase in the confidence in the recommendation and the extent to which it decreases the result set (i.e., differentiates between potentially matching products). In embodiments, the platform may run a series of product recommendations in hypothetical mode for all of the facts that could be considered as follow-up questions, replicating the logic and running the logic many, many times for different possible facts and performing very complicated calculations while it is doing that.

In embodiments, the forward chaining steps for product recommendations and the backward chaining steps for determining a next question may be performed in real time, while a user is in a question-and-answer dialog, using runtime components of the system, including a graph database and other components. For example, in a system where there are about 50 facts relevant to a line of products, the system can rapidly return recommendations and next questions to maintain a dialog.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
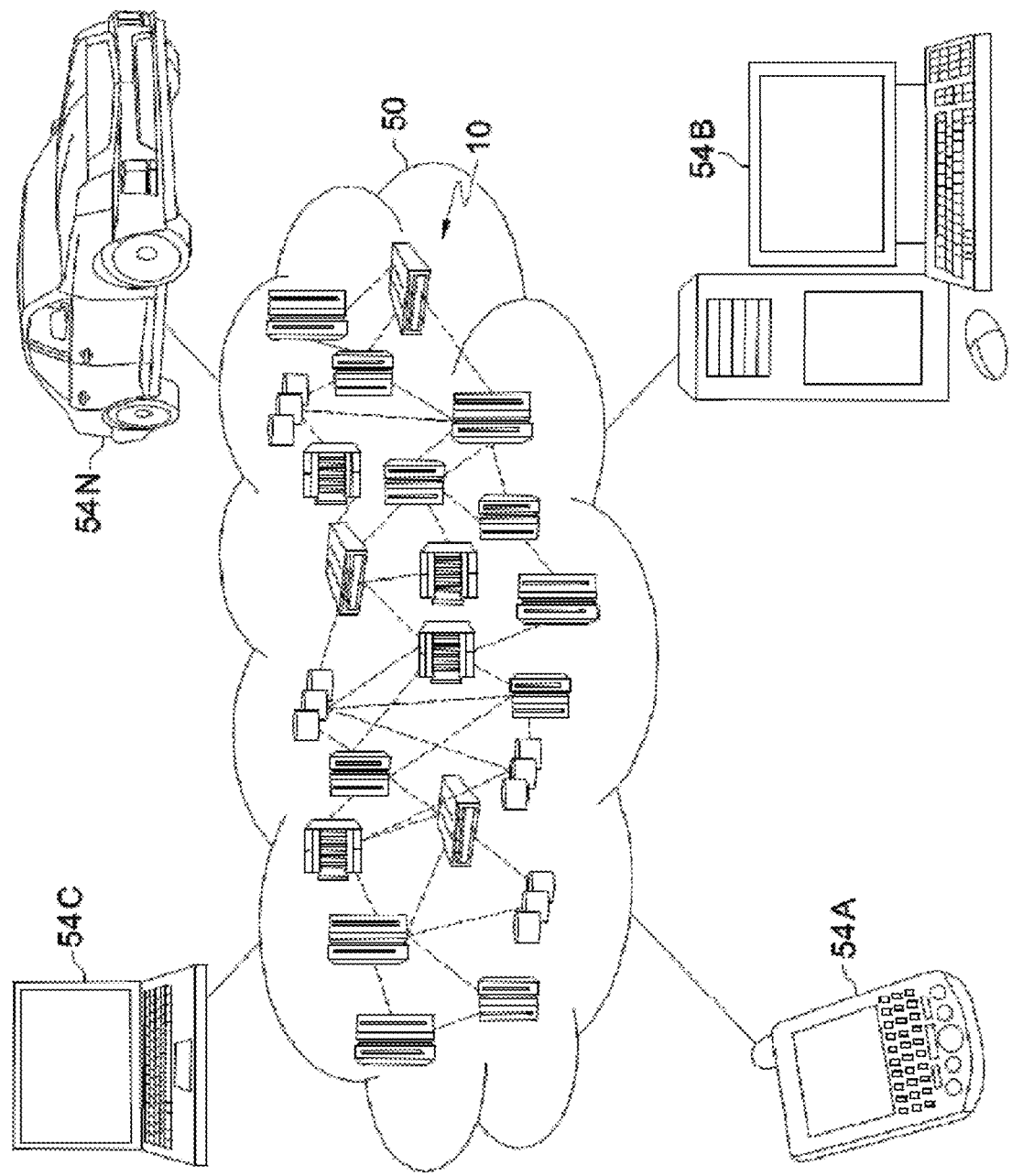
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
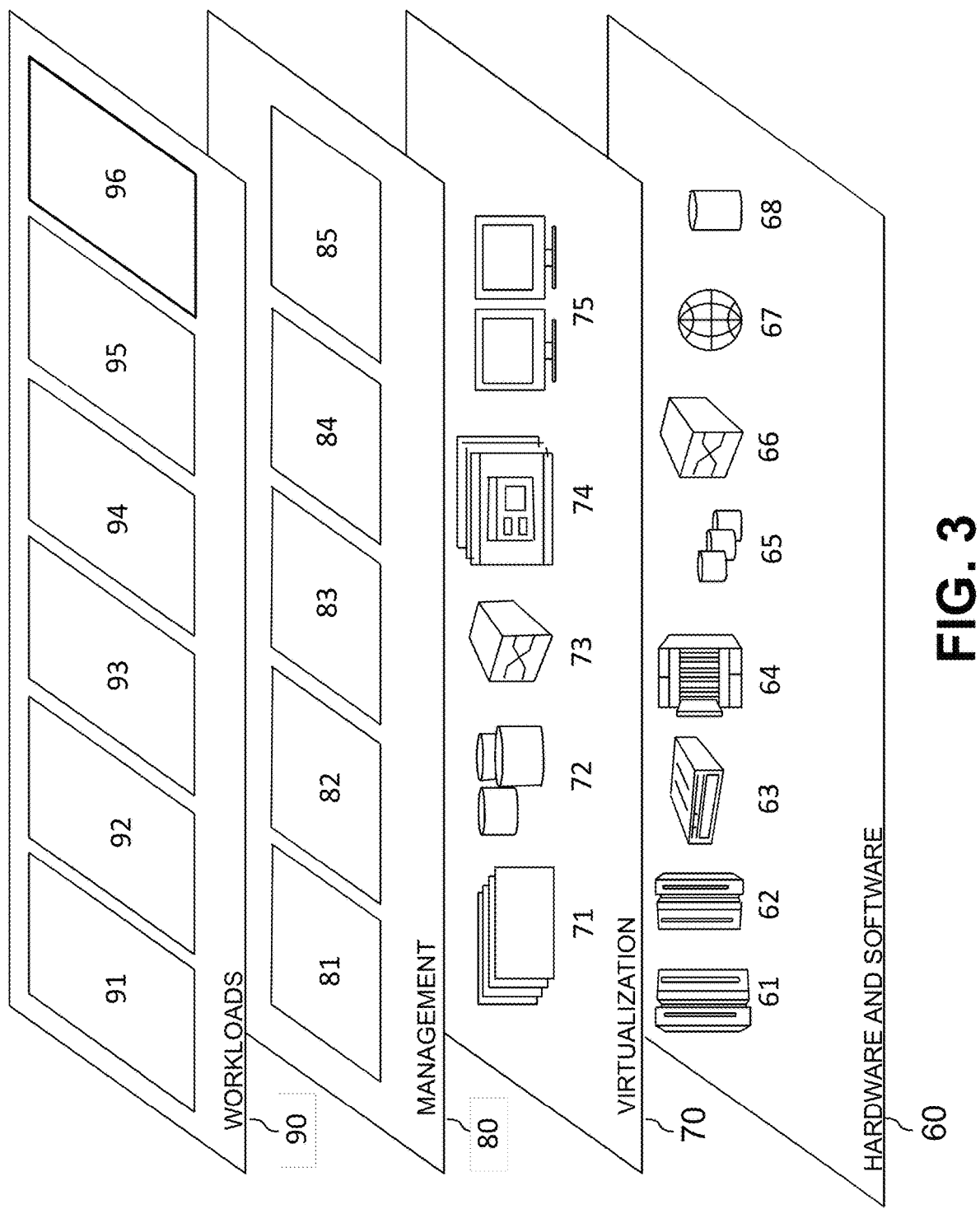
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dialoging platform 96.

Referring back to FIG. 1, the program/utility 40 may include one or more program modules 42 that generally carry out the functions and/or methodologies of embodiments of the invention as described herein (e.g., such as the functionality provided by dialoging platform 96). Specifically, the program modules 42 may present a first question via a user interface; receive a response to the first question via the user interface; determine a second question using the received response to the first question and a weighted collection of attributes corresponding to a plurality of items; present the determined second question via the user interface; receive a response to the second question via the user interface; determine at least one recommended item from the plurality of items based on the response to the first question, the response to the second question, and the weighted collection of attributes corresponding to the plurality of items; and present the determined at least one recommended item via the user interface. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a dialoging platform 96 as shown in FIG. 3.

Figure 4:
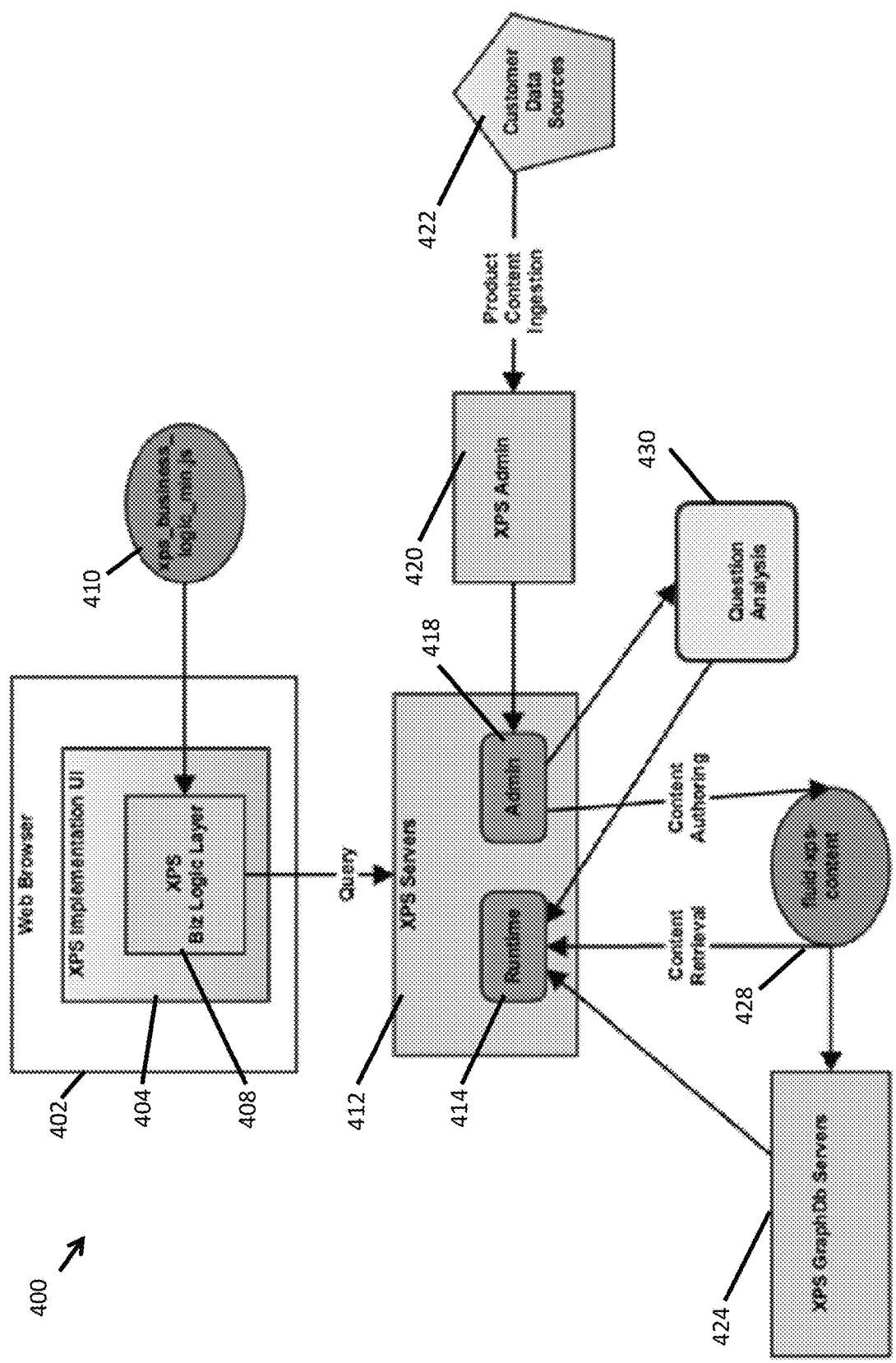
FIG. 4 shows various components and their interactions within an exemplary architecture for an information technology platform for enabling product recommendations through intelligent dialog.

Referring to FIG. 4, various components and their interactions within an exemplary architecture for an information technology platform 400 for enabling product recommendations through intelligent dialog are depicted. The information technology platform 400 is referred to herein in some cases simply as the "dialoging platform 400" and may be the dialoging platform 96 as shown in FIG. 3. A business logic layer 408, referred to herein in some cases as an XPS business logic layer 408, is configured to be run in an implementation user interface 404 in a web browser 402 of an implementer of the platform 400. The business logic layer 408 interacts with a business logic library 410, which in embodiments is a Javascript library, which may be stored on a storage infrastructure, such as a cloud storage infrastructure. The business logic library 410 may, in embodiments use an efficient, scalable content distribution system, such as a content delivery network, to distribute the content of the library 410, such as through content delivery network programming interfaces (APIs) that allow the developer of the library 410 to use it for content distribution.

According to another embodiment, the implementation user interface 404 may be implemented in the context of a short message service (SMS), chatbot, messaging application, messaging service, messaging platform, intelligent personal assistant, and/or voice platform.

The business logic layer 408 exposes an API that the implementation user interface 404 can call upon to obtain the data and state that it requires in order to render. This includes the customer identifier for the implementer (e.g., identifying the merchant who is offering a product line that will be supported by the dialoging platform 400), the name/identifier of the computing environment in which the implementation of the platform 400 will run, the API key for that customer-environment pair, and the location of the host server for the platform 400, such as expressed in URL format. The business logic layer 408 includes a number of type definitions and methods that enable the platform 400, as described in more detail below. The implementer of the business logic layer 408 loads to web page running in a web browser 402 that manages the state of a dialoging session (referred to herein in some cases as an "XPS session") and communicates with one or more servers 412, referred to herein in some cases as "XPS Servers," which support runtime and administrative capabilities for dialoging sessions. The XPS servers 412 may, in embodiments, comprise instance types that determine, upon launch, the type of hardware of the host computer that will be used for each instance, such as virtual computer instances on a cloud-computing platform. Each instance type may provide higher or lower minimum performance from a shared resource.

In the course of a dialoging session, the XPS business logic layer 408 initiates a prompt to a user in the user interface 404, usually a question that starts the dialog with a consumer. The consumer responds with an answer, such as by typing (or speaking, in the case of a UI that enables speech recognition) an answer to the question. The query-response information is passed to runtime components 414 of the XPS servers 412. The runtime components 414 of the XPS servers 412 relay the query-response information for parsing to an artificial intelligence-based question analysis facility 430. Once the question-response information is parsed by the question analysis facility 430, the parsed information is returned to the runtime component 414 of the XPS server 412 and relayed to one or more graph database servers 424, referred to herein in some cases as XPS GraphDb Servers, which make inferences about topics of interest to the consumer and inferences about products that may be of interest to the consumer. The graph database servers 424 may comprise auto-scaled virtual computer instances on a cloud-computing platform.

The graph database servers 424 operate on a set of product data from an implementer's product line that is stored in graph format; that is, the graph database 424 uses graph structures for semantic queries with nodes, edges and properties that represent and store product data, such as names, features and attributes of products. The graph (or edge or relationship) directly relates data items in the store. This contrasts with conventional relational databases, where links between data are ad hoc and based on the data itself, and related items are gathered by searching for this data within the store. The graph databases 424 are designed to allow simple and rapid retrieval of complex hierarchical structures, whereas a relational database would use a complex query to achieve the same end, generally with far poorer performance. The graph database servers 424 use a series of questions and responses to derive a product recommendation, such as determining, after a few well-targeted questions, that a consumer is looking for a red women's jacket for hiking, after which the platform 400 can present product options within an implementer's product line that fit that description. The graph database servers 424 perform analysis on the product data about which products are more or less likely to be good for particular interests or needs of the consumer as reflected by answers to questions in the dialog. Inferences are not typically binary, as each product (e.g., all the jackets offered by a jacket provider) can have its own relationship with each property reflected by a topic of need or interest. For example, if an answer is parsed to suggest that the consumer is looking for a "red" product, the products in the graph may have varying relationships to the term "red," as there may be ones that are more or less red. Similarly, there may be varying relationships to other properties, such as gender specificity, suitability for particular activities or weather, and the like. The graph database servers 424 weights the quality of a match on various criteria (such as reflected in a series of questions and answers in a dialog) and accumulates those into a confidence score that weighs based on criteria already identified and on the extent to which the available criteria are being considered. For example, if during a session the platform 400 is only looking at three criteria among ten that are possible, then the graph database 424 would tend to infer a relatively low confidence that a good match has been found for the consumer, as compared to a situation (such as later in the same session), where eight of ten possible criteria have been identified through the dialog. Based on the criteria available at that point in the session, the graph database servers 424 rank products numerically and send the results back to the XPS servers 412, which can retrieve information relating to the identified products, such as from a content server 428 that contains content relating to the products of the implementer, such as images, text, and the like that enable display of the products. The XPS servers 412 can serve the content for the highest scoring products to the web browser 402, so that the consumer can begin to see products that could be of interest while the dialog session continues.

In embodiments, the graph database servers 424 may also determine what additional information, if provided, such as in response to a new question, would be helpful to obtain a better (higher confidence) match for the consumer. The graph database server 424 may step through the things that could be known to help the session and evaluates the impact that knowing each of them could have on the confidence score. For example, among many other attributes that could relate to a product like a jacket, various weather conditions anticipated for the consumer could be relevant, such as rain conditions, wind conditions, or temperature conditions, as could various features or benefits the consumer is seeking, such as wanting the product to be waterproof, have a particular type of insulation, have a particular color, or the like. For any given product category, there are typically a whole slew of things that could be known to allow a more confident match to a product or set of products. The graph database servers 424 can assign a score to each of the unknown attributes, features, or the like that reflects the extent to which a confidence would likely be improved by knowing that piece of information. The graph database servers 424 then iterate through those to determine the most helpful (highest scoring) piece of information, which in turn can be used to determine the next question in the dialog.

The aforementioned runtime steps can repeat through a series of questions and answers, managed through the runtime components 414 of the XPS servers 412 as they interact with the question analysis facility 430, the graph database servers 424 and the business logic layer 408, each iteration improving the confidence in the match of a set of possible products to a consumer's expressed interests based on a new question that is selected to reduce the uncertainty. The dialog can progress until the consumer has found the desired product or a point arrives where there are no further productive questions to ask.

The XPS servers 412 may also enable various administrative components 418, which are used, among other things, to provide the platform 400 with the data and content it requires in order to undertake the various functions the runtime components 414 manage and execute during a dialoging session as described above. In embodiments, product data may be ingested from a customer data source 422, such as a customer's database of products, which may contain product identifiers and information about features, attributes, specifications, and benefits of the product, among other information. Ingestion may include various techniques for extraction, transformation, loading, cleansing, normalizing, and the like, to place the product data into a format suitable for use by the platform 400. In embodiments, product data is loaded into table, such as stored in a spreadsheet 420, that is structured in a simple format for ingestion by administrative components 418 of the XPS servers 412 for use by the platform. The spreadsheet 420 may be stored in a SaaS platform or application to enable access by the XPS servers 412. The table(s) in the spreadsheet 420 may contain a product identifier for each product in the product line of an implementing merchant, a product name, and a series of columns that indicate the presence or absence of various features, benefits, and the like for the product. The spreadsheet 420 may contain content about the product, or links to such content, such as graphics, photographs, images, videos, specifications, descriptions, reviews, and the like, similar to any of the content one would find when shopping for a product in an e-commerce environment, as well as questions that may help differentiate the product from other products, such as, in the example of a hiking jacket, questions like "what activities are you going to be doing on your trip?" The information in the spreadsheet 420 may be ingested by the administrative components 418, which may in turn feed the information to other components of the platform 400, such as the question analysis facility 430 (where the data is used to support the functions described above) and the content repository 428 (where content can be pulled from the spreadsheet 420 or from locations, such as customer data sources 422, identified in the spreadsheet 420. In embodiments, the platform contains code that is configured to parse the data in the spreadsheet 420 and publish it in formats, such as in .json files, that are in turn used by the runtime components 414. The formatted content (e.g., .json files) may be stored in a cloud-based storage platform for access by the runtime components 414.

Figure 5:
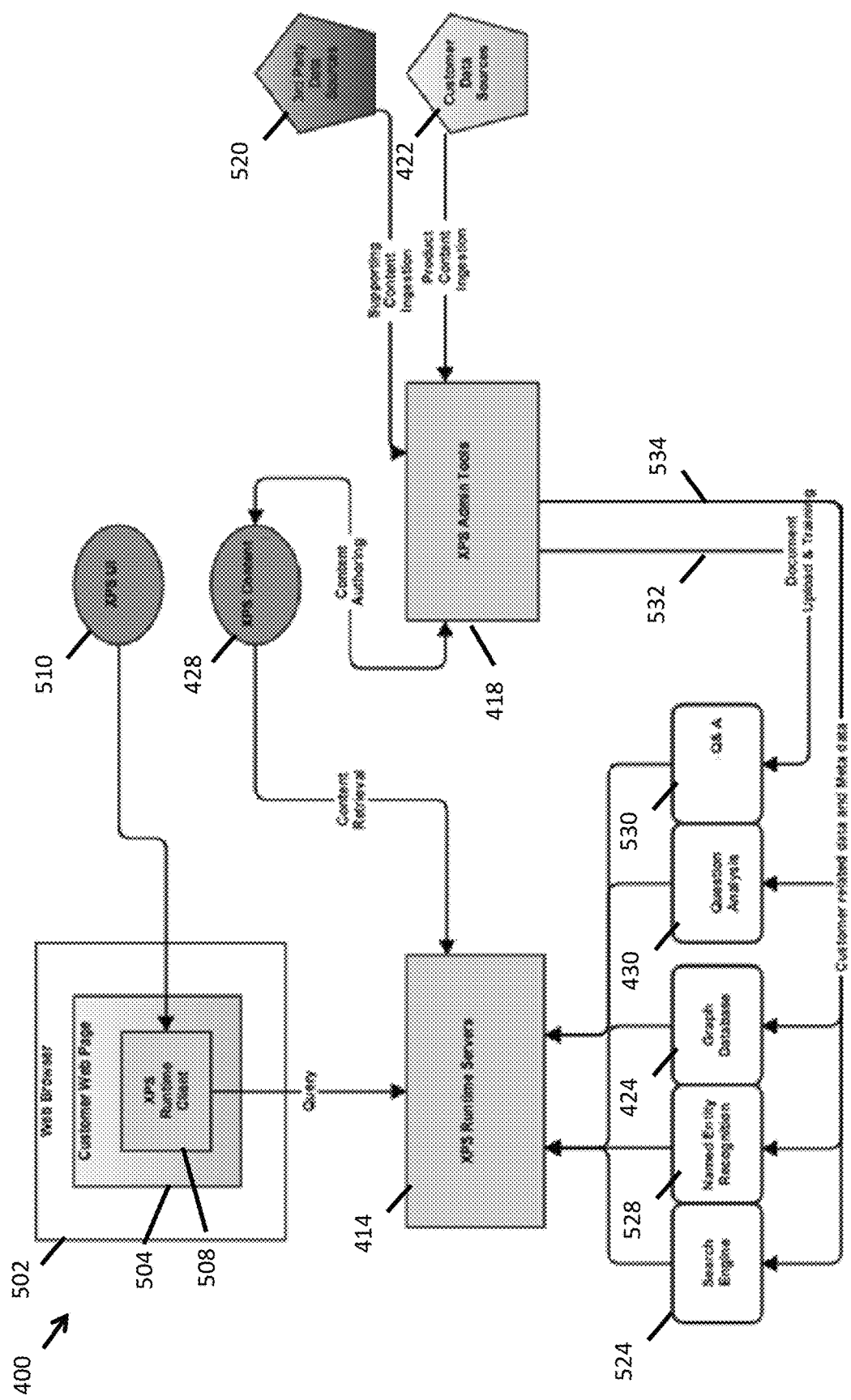
FIG. 5 shows additional components of the platform and additional information about the interaction of the components of the platform, according to an embodiment.

FIG. 5 shows additional components of the platform 400 and additional information about the interaction of the components of the platform, according to an embodiment. During a dialog session, a customer's web page 504, such as the web page of an implementing merchant that enables dialoging as a capability within the merchant's e-commerce environment, is rendered in a web browser 502 of a consumer who visits the web site, such as during a browsing session, after clicking on a link during a search, or the like. The web page may be configured to display content rendered by a runtime client 508 of the platform 400, referred to herein in some cases as the XPS runtime client 508. The runtime client 508 may render user interface content from a user interface repository 510, such as a cloud-based repository, such as, in embodiments, a repository of user interface content a cloud-based storage platform from which content is distributed by a content delivery network. Query information may be passed from the XPS runtime client 508 to the runtime components 414 of the XPS servers 412, such as containing information about what information a user has entered in response to a question and other information, such as information about what is being displayed on the page and information about user activity on the page. As noted above, the XPS runtime components 414 may retrieve content from the content repository 428, such as content that has been authored using the administrative components 418, referred to herein in some cases as XPS admin tools. The XPS admin tools 418 may, as noted above, ingest data from customer data sources 422 (such as product data, metadata, links to additional information, etc.) and data from third party data sources 520 (which may contain further information about products, such as reviews on third party websites, as well as other information. The admin tools 418 may be used to configure and pass data and meta data via appropriate interfaces 534 (e.g., APIs, connectors, brokers, gateways, bridges, or the like) to various components of the platform 400 for use by the runtime components 414. These may include the question analysis facility 430, the graph database 424, one or more search engines 524 and one or more facilities for named entity recognition 528. The admin components 414 may also provide documents and other training information for machine learning, such as via an interface 532 (e.g., an API or other interface or communication link as noted above), such as to an intelligent question and answer facility 530.

Figure 6:
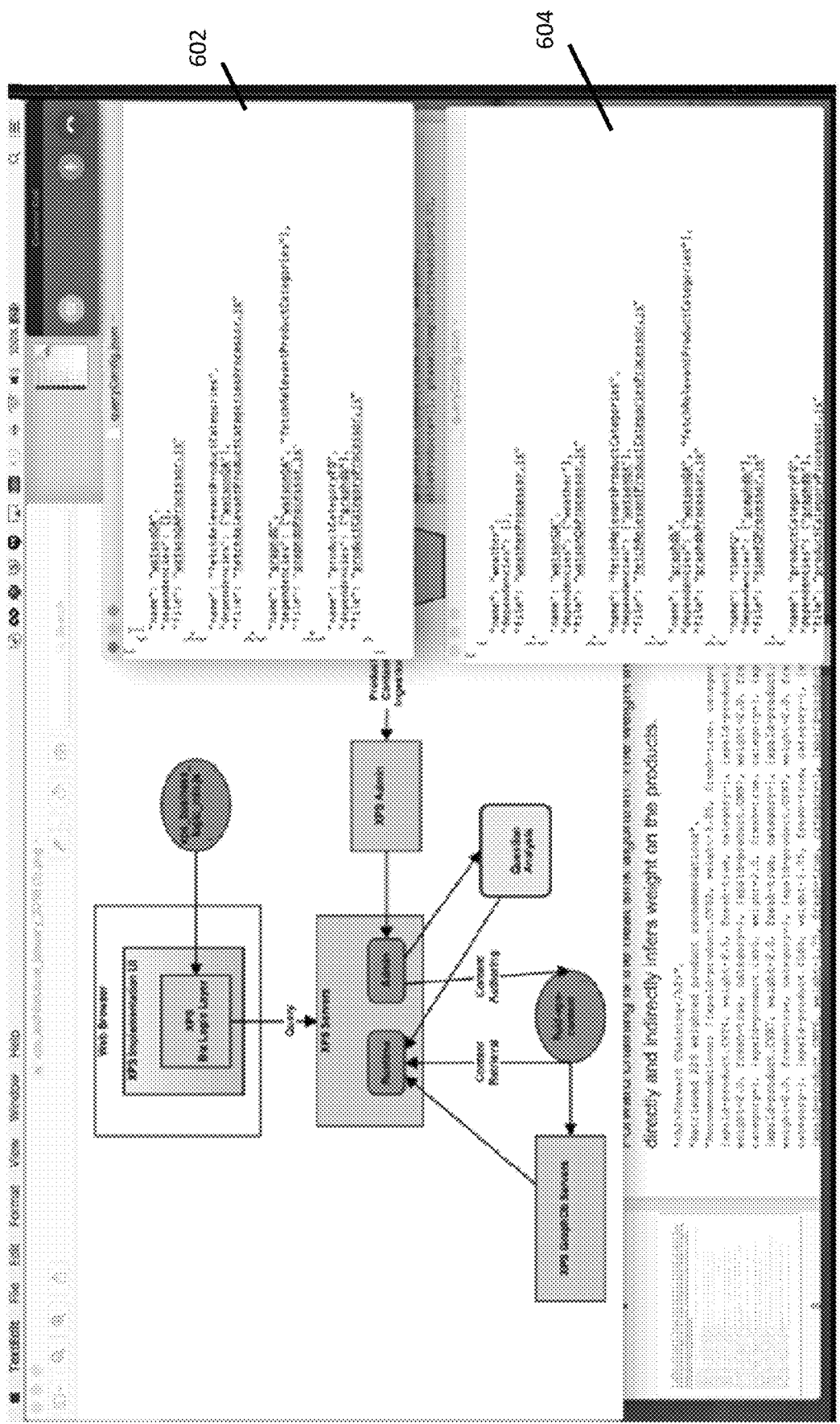
FIG. 6 shows examples of queries displayed in the .json format code, according to an embodiment.

The platform 400, as described above, thus operates at runtime to manage a dialog session by taking a consumer through a series of questions that are automatically configured, using machine intelligence, to guide the customer to a suitable product within a set of products that have various features and attributes that may meet the needs of the consumer. One important aspect of the methods and systems enabled by the platform is configuration of queries. Examples of queries are displayed in the .json format code 602, 604 shown in FIG. 6. As noted above, as a dialoging session is under way, the runtime components 414 parse query information, such as by interacting with the question analysis facility 430 to find elements of interest, interacting with the graph database 424 to undertake various actions noted above, and undertaking the processing to provide the information to determine the next question and to begin to determine potentially relevant products for presentation to the consumer.

In embodiments, the query processing framework of the platform 400 can build up any number of independent information services and interact with each of them independently. Thus, provided herein are methods and systems that provide a query configuration pipeline for retrieving information from a plurality of distinct services, where the services provide information that can be used to assist in determining a fit of a product to a consumer and in determining what questions should be posed to a consumer to help narrow down products to a relevant subset from a larger set of products. The pipelines may include services that are independent of the others and services that are interdependent with the other. For example, as reflected in the query configuration examples 602, 604, services may gather information about weather (such as retrieving climate data and weather predictions for a location indicated by a consumer in response to a question about where the consumer will be traveling, which might be obtained from an outside weather source (e.g., "weatherProcessor.js", from the question analysis facility 430, or the like), information about product categories (e.g., "fetchRelevantProductCategories" may engage a service to indicate potentially relevant product categories based on potential relevance to information entered by a consumer, such as using the question analysis facility 430 operating on data ingested from a product database 422 or "productCategoryFQ" can fetch categories from a category processor services (e.g., productCategoryProcessor.js)). That is, for any given type of information that can be used the platform to help determine a relevant product category, product, or next question, the information can be pursued through multiple services, which may be independent or interdependent. The information can be assembled and combined together for further processing. Each customer (e.g., a merchant implementing dialoging in its e-commerce environment) can have a different pipeline for pulling in information from various relevant services that help provide the platform the data it uses to manage the session.

The j.son file 602 shows a simple example of a query configuration pipeline, where the question analysis facility 430 and the graph database 424 ("graphdb") are identified as services from which information is retrieved. The additional service "fetchRelevantProductCategories" may be helpful in situations where the merchant offers multiple product categories. In some cases, such as a provider of only hiking jackets, category information may be inferred by the presence of the consumer at that merchant's site; however, many merchants offer products in many different categories, so services like "fetchRelevantProductCategories" can find categories that potentially match initial information entered by a consumer, such as search information, or that respond to other information indicating a consumer's possible information, such as browsing behavior, location information, past purchases, and the like. In some cases, a service like "productCategoryFQ" may determine whether it is appropriate to ask the consumer a follow-up question about the product, such as asking directly what category the consumer is shopping for. In the query configuration example 602 the XPS server 412 may start with the question analysis facility 430, such as by pulling appropriate code, such as javascript code. After that, categories may be obtained, in this case with dependency built in on the results returned from the question analysis facility 430. Subsequently the graph database 424 may be used, with dependencies on the results from the question analysis facility 430 and on the categories fetched by the "fetchRelevantProductCategories" service. Again, code, such as javascript code (here "graphdbProcessor.js") from a file can be used to return results from the graph database 424. Thus, the query configuration pipeline 602 creates a flow by which relevant information is retrieved from various services to obtain the information needed to manage the questions and answers in the dialog session that lead to a product recommendation.

A more complex pipeline is shown in the other query configuration .json file 604, where weather information can be obtained, such as by using code, such as javascript code (here "weatherProcessor.js") and subsequently retrieving weather-dependent results from the question analysis facility 430. As with the simpler flow 602, product categories may be fetched, with dependency on the results of the use of the question analysis facility 430. In some cases time may be a factor in determining an appropriate product. Thus, the more complex pipeline 604 may include a service that determines whether to pose a follow-up question that is based on time (here "timeFQ"), such as to allow a consumer to indicate an answer that indicates the time when a product will be used, needed, or the like. This might be the case when location is known, but where the time of use is not known (such as when the location is in an area where the weather varies greatly from season-to-season). Factors like time and weather can be used to derive facts, to infer facts, to influence selection of product categories, or the influence product recommendations, and the like. Any such factors that help influence recommendations may be made the subject of one or more services that are configured to be queried via a processing pipeline like the pipelines 602, 604 shown in FIG. 6. Once various services that are configured in a query processing pipeline like the exemplary pipelines 602, 604 are finished retrieving relevant information, the platform 400 has the information to determine what sets of products might satisfy a consumer's wants or needs and what questions might be posed to narrow down the field to a most relevant set of products.

Figure 7:
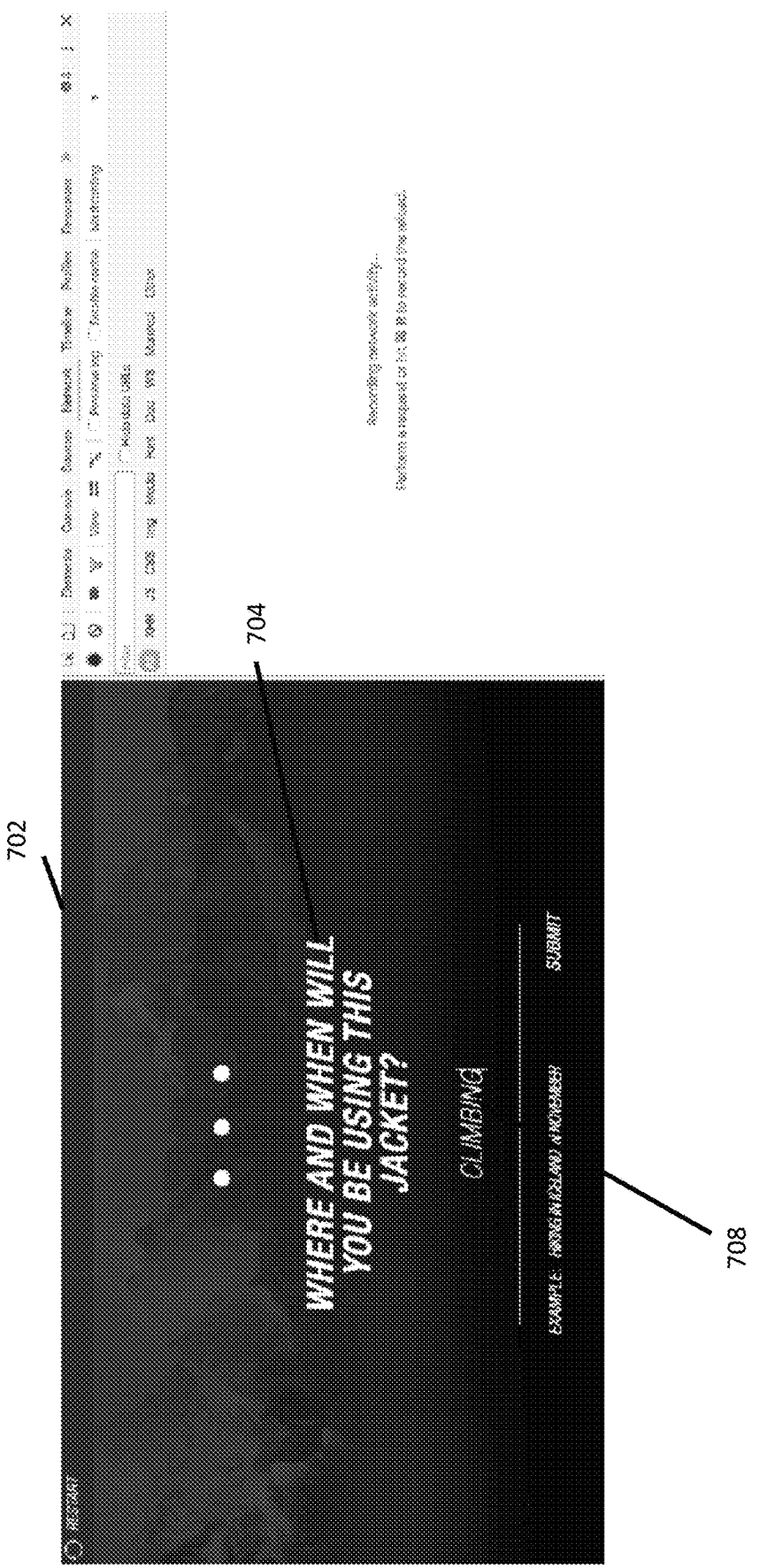
FIG. 7 shows an example of a dialog box that renders in an implementing merchant's web page as displayed on consumer's web browser, such as when the consumer visits the merchant's website according to an embodiment.

FIG. 7 shows an example of a dialog box 702 that would render in an implementing merchant's web page 504 as displayed on consumer's web browser 502, such as when the consumer visits the merchant's website according to an embodiment. The dialog box 702 may include a question element 704 for rendering questions identified by the runtime components 414 (including ones selected from content authored using admin tools 418) and an answer element 708 for accepting an answer from a consumer to the question. Thus, the dialog may commence with a question in the question element 704. In embodiments, the answer by a consumer can be written as free, unstructured text, such as the consumer might respond to a salesperson in a live, retail environment. In cases where the merchant offers a single category of product, the dialog may begin with a question that is helpful in narrowing down within that category (such as "where and when will you be using this jacket?" in the case of an exemplary embodiment involving a merchant that provides hiking jackets). The user interface for the dialog may provide examples that help prompt the user as to how to answer the question and may include a mechanism allowing the user to submit the answer for further processing.

Figure 8:
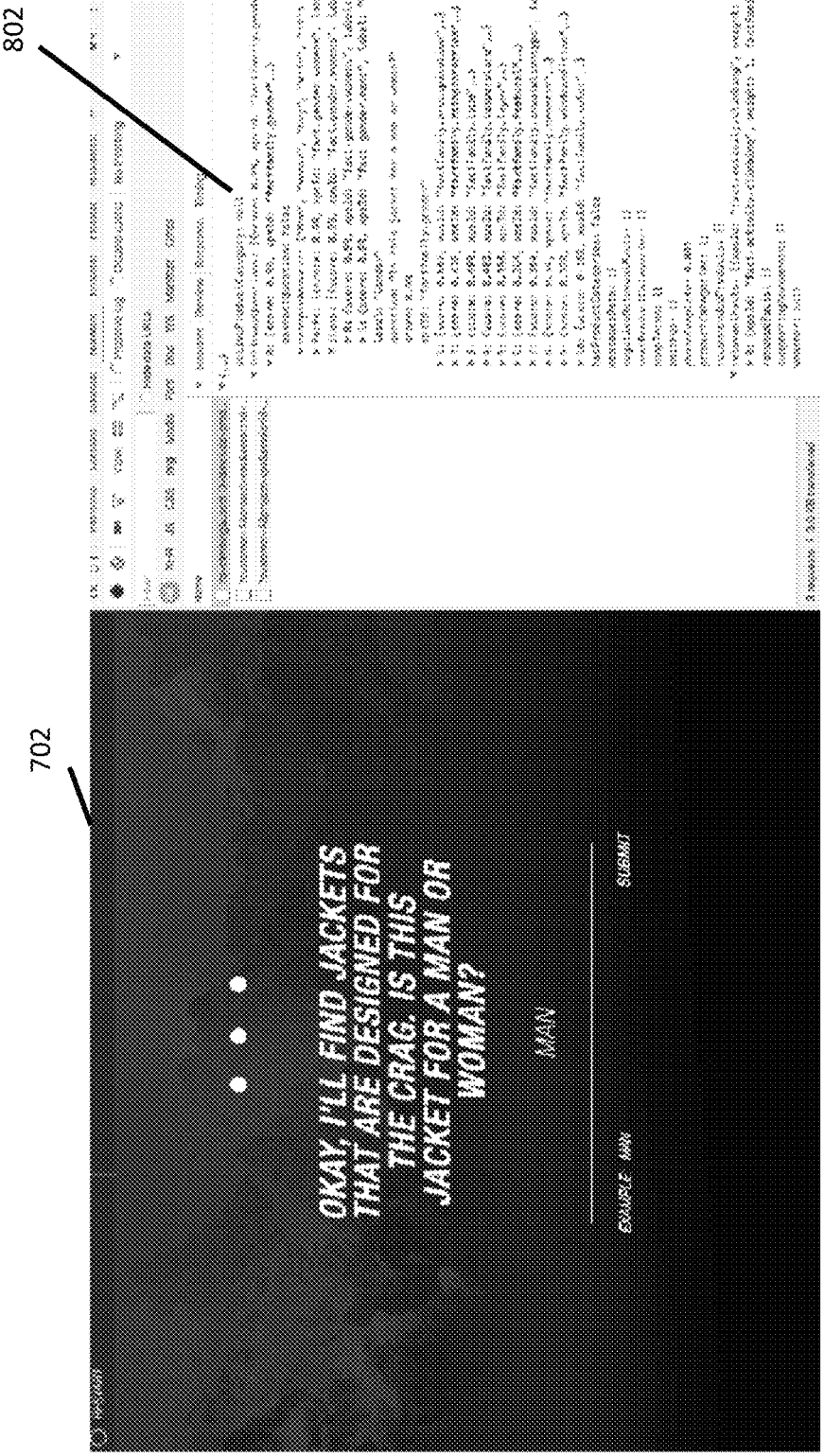
FIG. 8 shows the continuation of the dialog, such where a follow-up question is presented in the dialog box, according to an embodiment.

FIG. 8 shows the continuation of the dialog, such where a follow-up question is presented in the dialog box 702, according to an embodiment. The questions are presented based on the activities of the runtime components 414 of the XPS servers 412. The server log 802 shows server activity that occurs during the dialog session, commencing at the start of the session. As seen in the server log 802, when the dialog starts, the platform 400 may lack information that would be valuable, such as the nature of the product category. The platform 400 may, for example, determine scores that relate to various available facts (here labeled "factfamily" in this embodiment) that could help identify a relevant product. A score can be determined for each fact family, such as ones based on gender, precipitation, insulation type, benefits, wind conditions, and the like, where a higher score (in this case on a normalized scale from zero to one), indicates the extent to which knowing a fact will help improve a product recommendation. For example, in the log 802 it can be seen that the fact family related to gender has a score of 0.99, resulting in determining that the next question should ask a question that prompts indication of a gender, such as "is this jacket for a man or a woman?"

Figure 9:
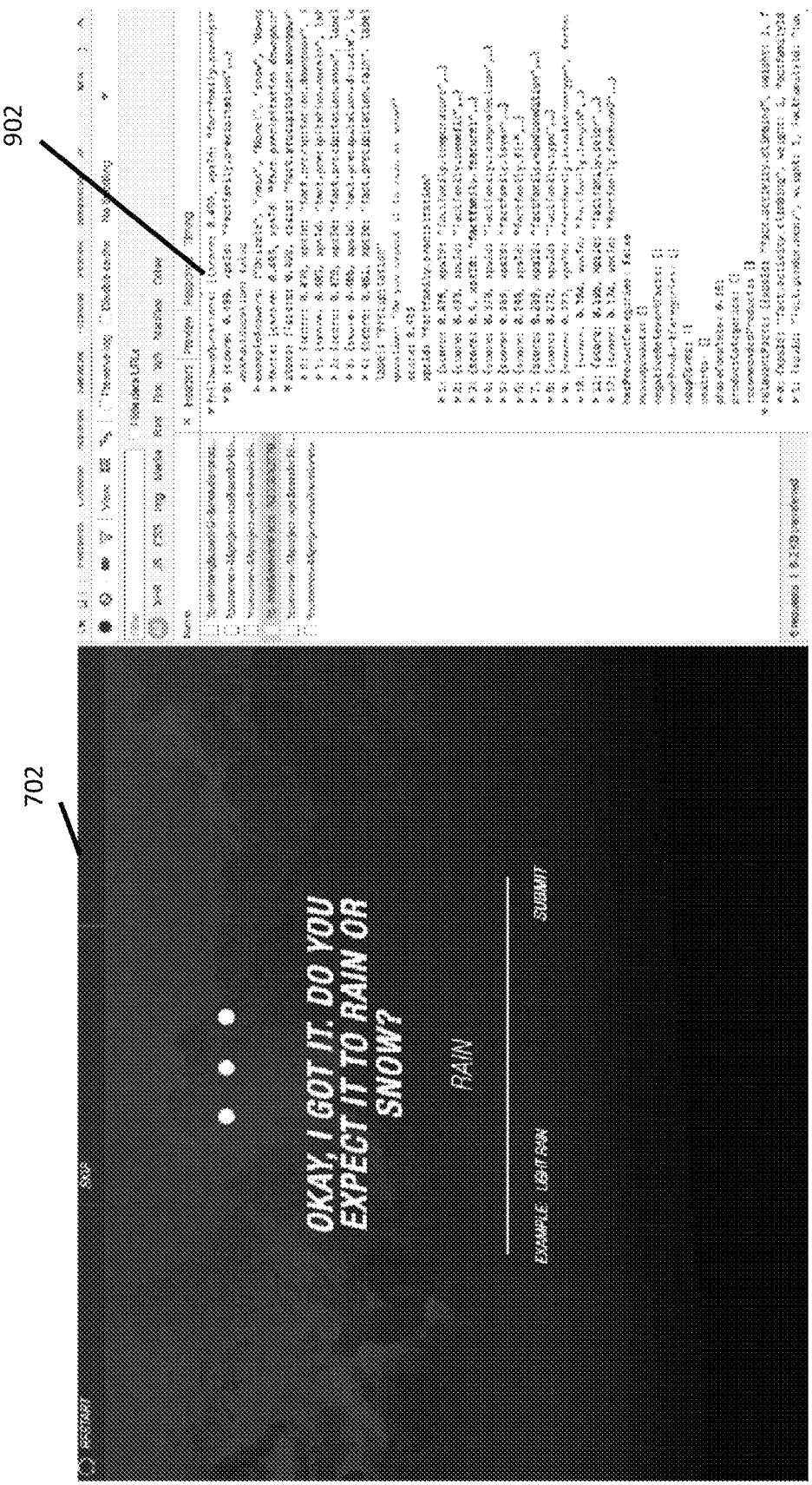
FIG. 9 shows an embodiment in which the system progresses to other sets of facts that help determine what product(s) might be relevant to the consumer.

Referring to FIG. 9, according to an embodiment the system may progress to other sets of facts that would help determine what product(s) might be relevant to the consumer. The server log 902 shows various facts that are potentially relevant to precipitation, such as words like snow, drizzle, rain, downpour, or the like. This leads to identifying the next question for the dialog box 702, in this case "do you expect it to rain or snow?" The platform 400 continues to seek out what facts, among various fact families, if known, would narrow the field to more relevant products.

Figure 10:
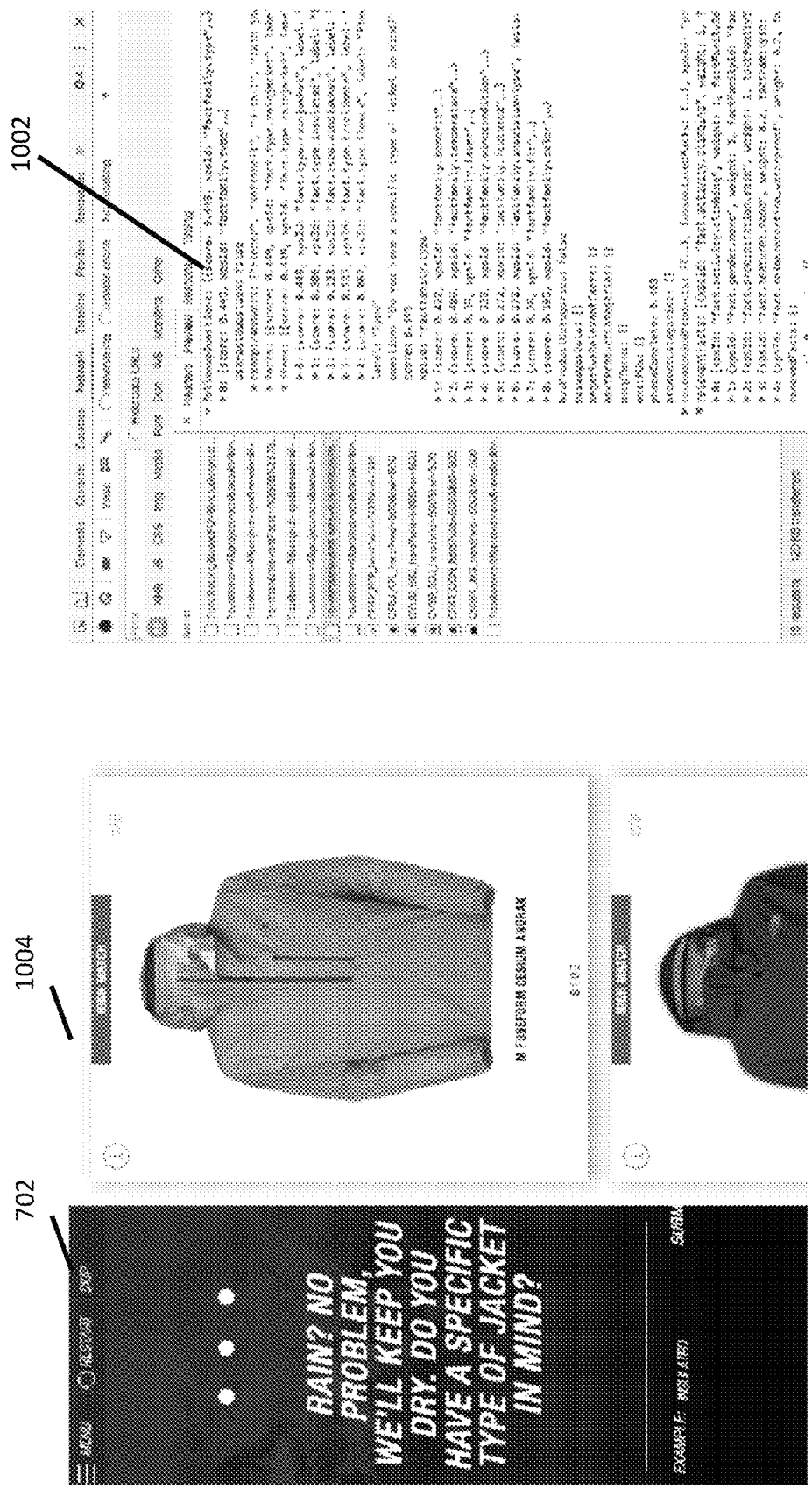
FIG. 10 shows an embodiment in which the dialog continues with questions and answers in the dialog box, with the platform performing analysis of facts that are derived or inferred from the answers of the consumer.
Figure 13:
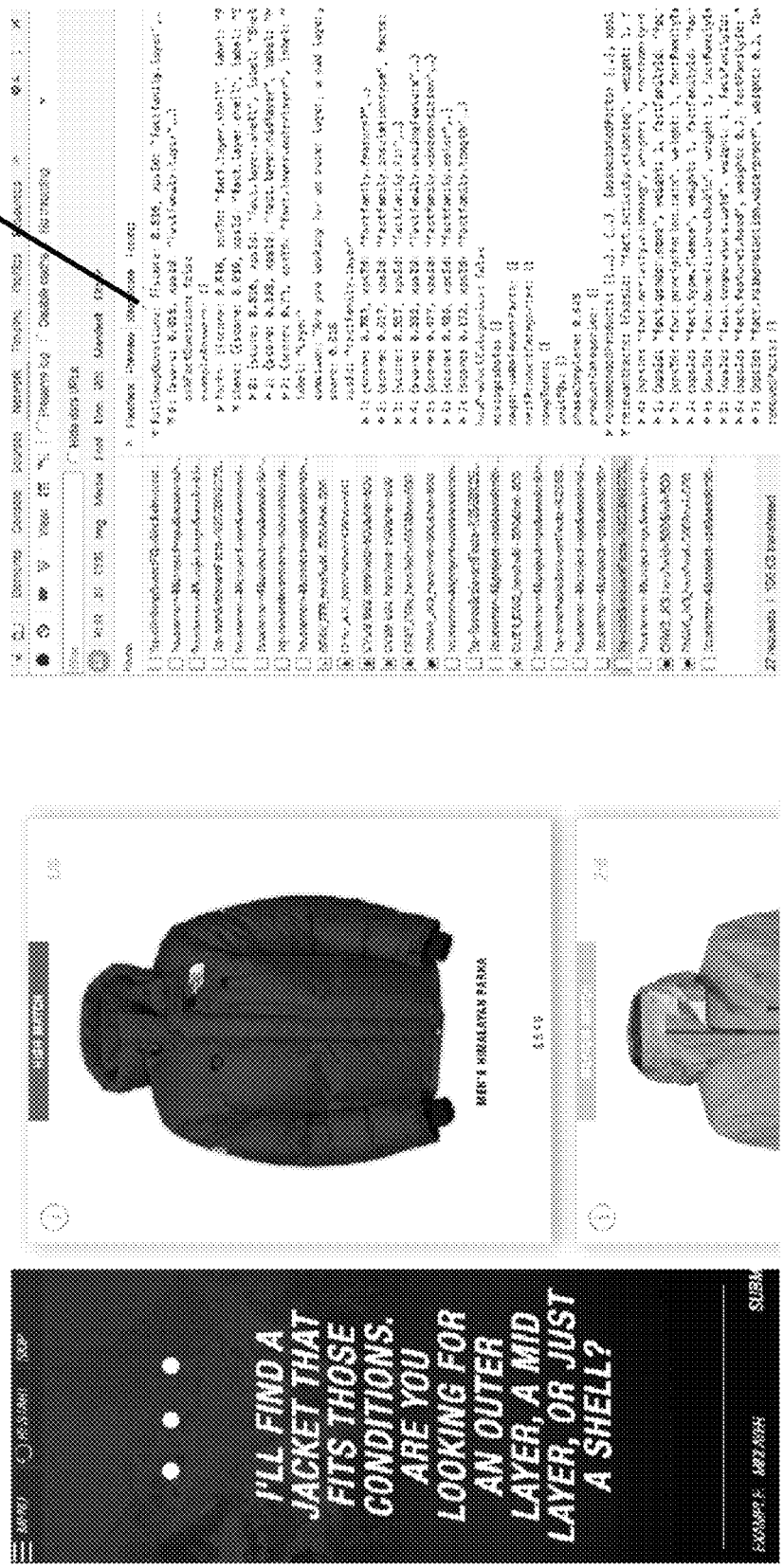
Figure 14:
Figure 15:
Figure 16:
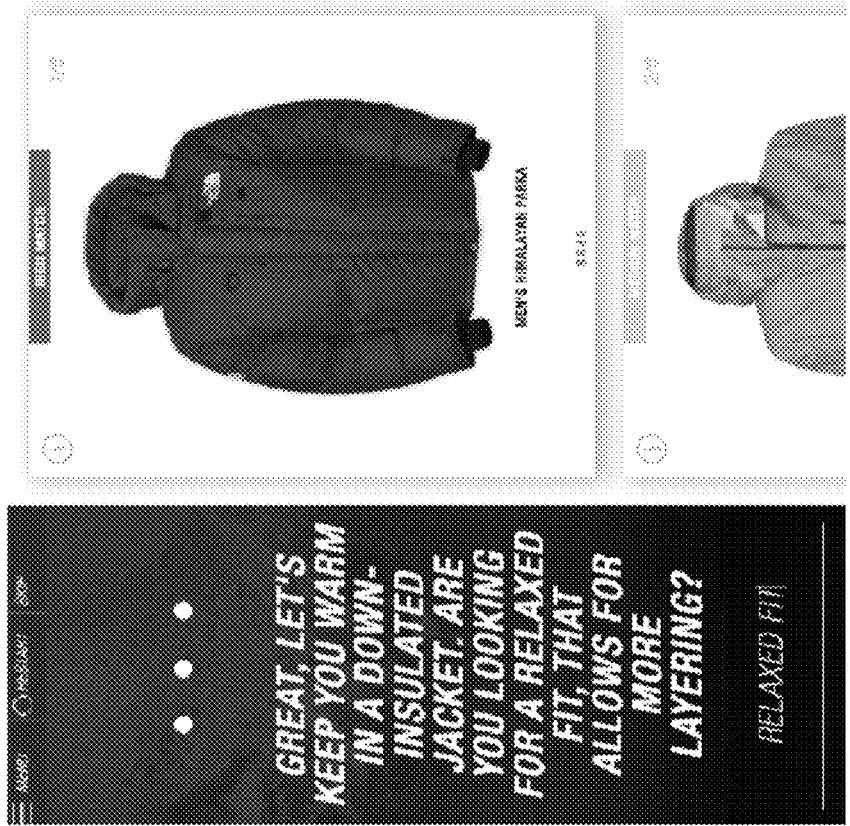
Figure 18:
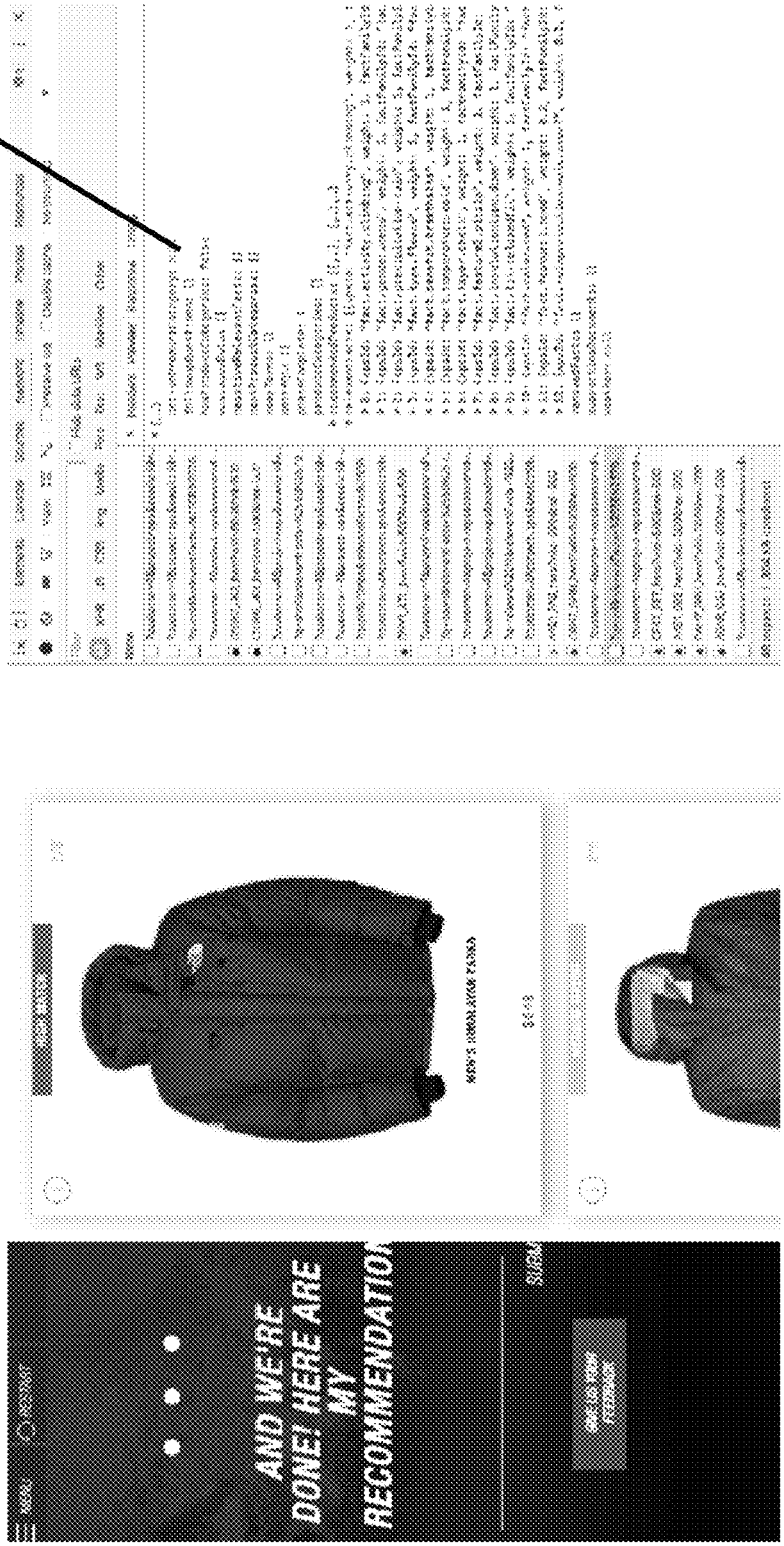

As seen in FIG. 10, according to an embodiment dialog may continue with questions and answers in the dialog box 702, with the platform 400 (including runtime components 414 of XPS servers 412 interacting with the question analysis facility 430 and the graph database 424) performing analysis of facts that are derived or inferred from the answers of the consumer. Portions of such analysis and related facts are reflected in the server log 1002. In this case, the platform 400 determines that a question about the type of jacket will provide information, and the consumer indicates "insulated," which is a fact that has a relationship in the graph database 424 to each product of the merchant. In embodiments, potentially relevant products may be displayed, such as in a product display pane 1004. Whether and when to display products may comprise a configurable option in the platform 400. For example, thresholds may be set in the platform 400 (which may be configurable on a merchant-by-merchant or category-by-category basis, or the like), which are used to determine whether there is enough confidence in a match to a particular product to begin to show potentially matching products (which may be presented in order of relevance based on facts known at a particular point in the dialog). A low threshold would allow showing many products before many questions have been asked, while a high threshold might require numerous questions before a match is determined. As with other steps in the dialog, the platform 400 continually looks to determine what questions to ask next, based on which questions will prompt answers that improve the confidence in a match.

Figure 11:
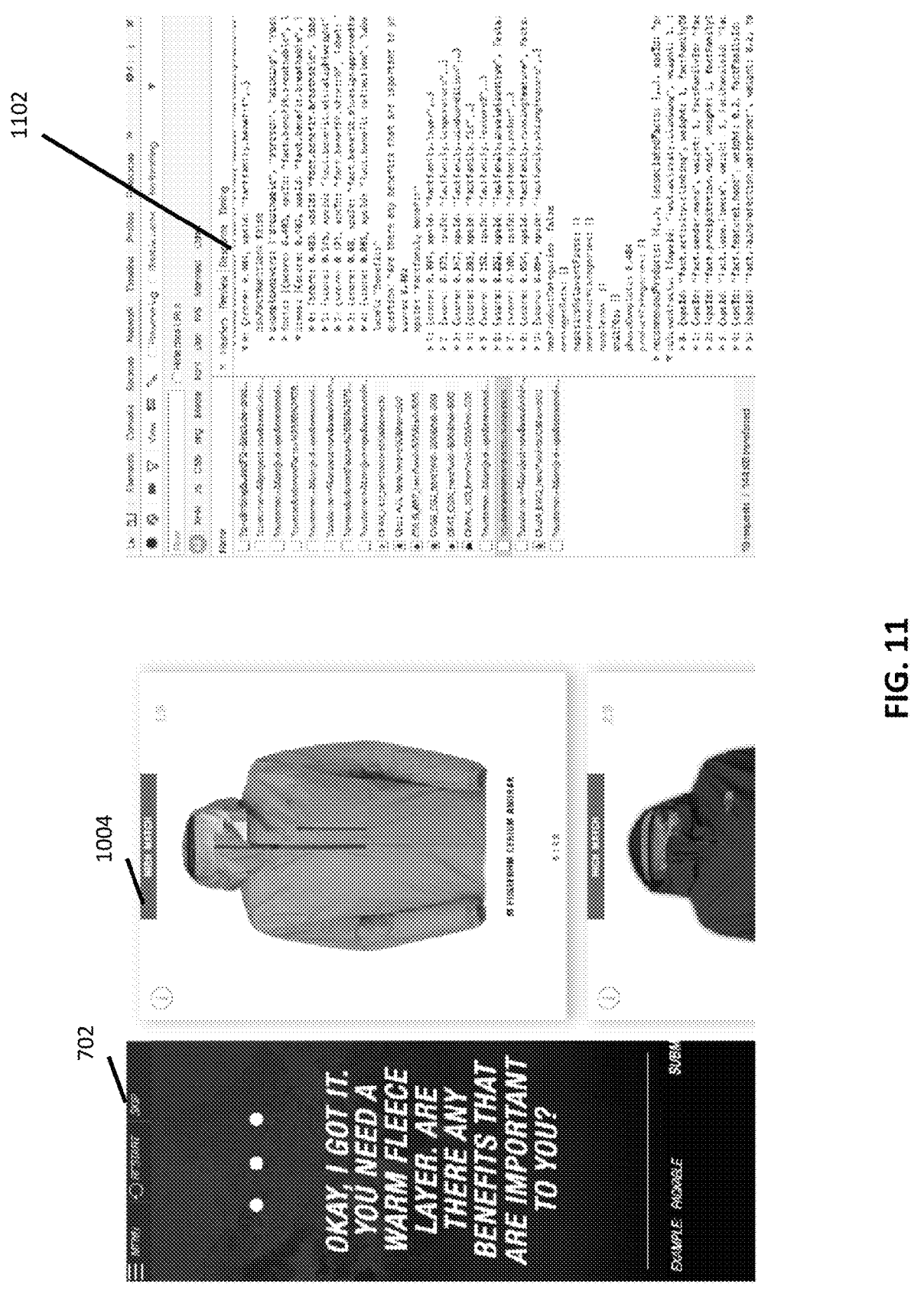

FIG. 11 shows additional dialog in the dialog box 702, resulting in additional processing by the platform 400, portions of which are reflected in the server logs 1102 according to an embodiment. In this case the platform 400 determines that a question about the benefits of the product should improve the ability to determine relevant products, some of which are displayed in the display pane 1004. Many different facts potentially correspond to benefits, reflecting a wide range of benefits that are attributed to different products in the graph database 424 that stores relationships of products for a given merchant.

As the dialog progresses, facts accumulate, based on answers to previous questions, whether about product features, uses, benefits, or other parameters. The graph database 424 may, in embodiments, use forward chaining logic, such as embodied in a heat sink algorithm, to determine the heat, or cumulative degree of relationship of each particular product in the graph database 424 with respect to the various accumulated facts, such as facts relating to product attributes, to benefits, and the like. Products may then be sorted from highest heat to lowest heat, with products of high heat being presented, provided a threshold is met, in the product pane 704 with an indicator, such as "high match." Forward chaining logic starts with the available data and uses inference rules to extract more data (solicited from an end user, for example) until a goal is reached, in this case a product recommendation.

Within the graph database 424 there is an "edge weight factor," reflecting how much is known versus how much could be known in a product category. For example, with four facts (e.g., cold, rain, climbing type, etc.), there might be another seven that could be known about the product (e.g., gender, size, etc.). The confidence applied to a recommendation may be scaled based on how much is known versus how much could be known. As facts become known, the possible range of positive answers may be narrowed, so that it is quite unlikely that questions will be needed that address all possible categories of fact. Instead, uncertain can be reduced for multiple possible facts by the question process.

In embodiments, edge weights can be determined for each fact (e.g., "type," "insulated," "gender," etc.), and it can be determined which features or benefits would, if known, narrow down the result set most effectively. In embodiments, the platform 400 looks not only at the direct relationship between facts and products, but also the inferred relationships. For example, a fact like "rain" might allow inference of facts such as "downpour," "waterproof," and "hood" in an exemplary example involving hiking jackets.

Figure 12:
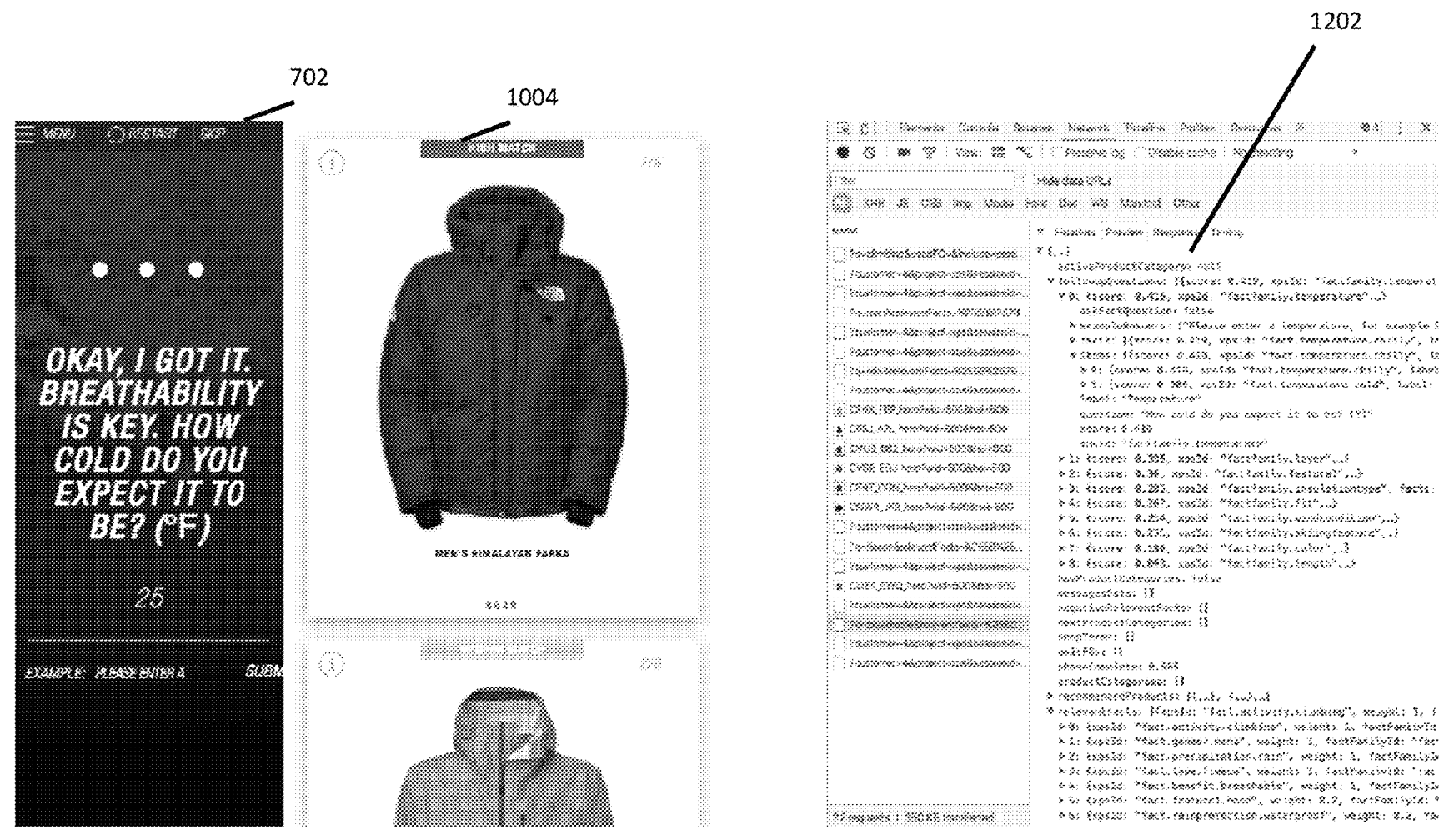

Referring to FIG. 12, according to an embodiment dialog can continue in the dialog box 702, with the best matching products shown in the product pane 1004, updated based on the dialog steps undertaken at this point in the dialog. The server logs 1202 show portions of the activity of the platform 400, including XPS servers 412, including the runtime components 414 that interact with the question analysis facility 430 and the graph database 424. The platform 400 uses product data, such as from the spreadsheet 420 into which a merchant's product data 422 was ingested, to figure out which facts align best with which products, and which next questions will provide the most additional differentiation among products. To figure out the next question to ask, the platform 400 considers, among possible questions, how much each question will increase confidence in a match of a product to a consumer, which is in turn based on how that question will divide the set of possible results. For example, if, in the exemplary embodiment of a search for a jacket, if it is already known that a consumer is looking for a rain jacket, it is not helpful to ask whether the consumer wants the benefit of it being "waterproof," as all products that respond well to the "rain" fact will also respond well to the "waterproof" fact. On the other hand, if about half of the jackets have hoods and about half do not, then a question about wanting a hood might provide a significant narrowing of the possible set of products. Thus, determining the next question to ask is highly dependent on the data set in question and on the preceding steps in the dialog.

In embodiments, backward chaining logic may be used to determine the next question. Backward chaining starts with a list of goals (or a hypothesis) and works backwards from the consequent to the antecedent to see if there is data available that will support any of the consequents. Each fact not already known represents a potential follow-up question. The further the dialog has progressed in a session, the fewer germane products there are from the forward chaining product recommendation process executed using the graph database 424. As a result, there are fewer and fewer potentially relevant questions. While early questions may split the potential result set well, as the dialog nears a recommendation of a particular product, the process simplifies to one in which the next question merely asks a question that reduces the set.

FIGS. 13, 14, 15, 16, 17, and 18 show the dialog progressing through a series of product recommendations generated by the graph database 424 using forward chaining logic and a series of questions generated using backward chaining logic, until a specific product recommendation is determined, according to an embodiment. The server logs 1302, 1402, 1502, 1602, 1702, 1802 show portions of the activity of the platform 400, including XPS servers 412, including the runtime components 414 that interact with the question analysis facility 430 and the graph database 424.

Figure 19:
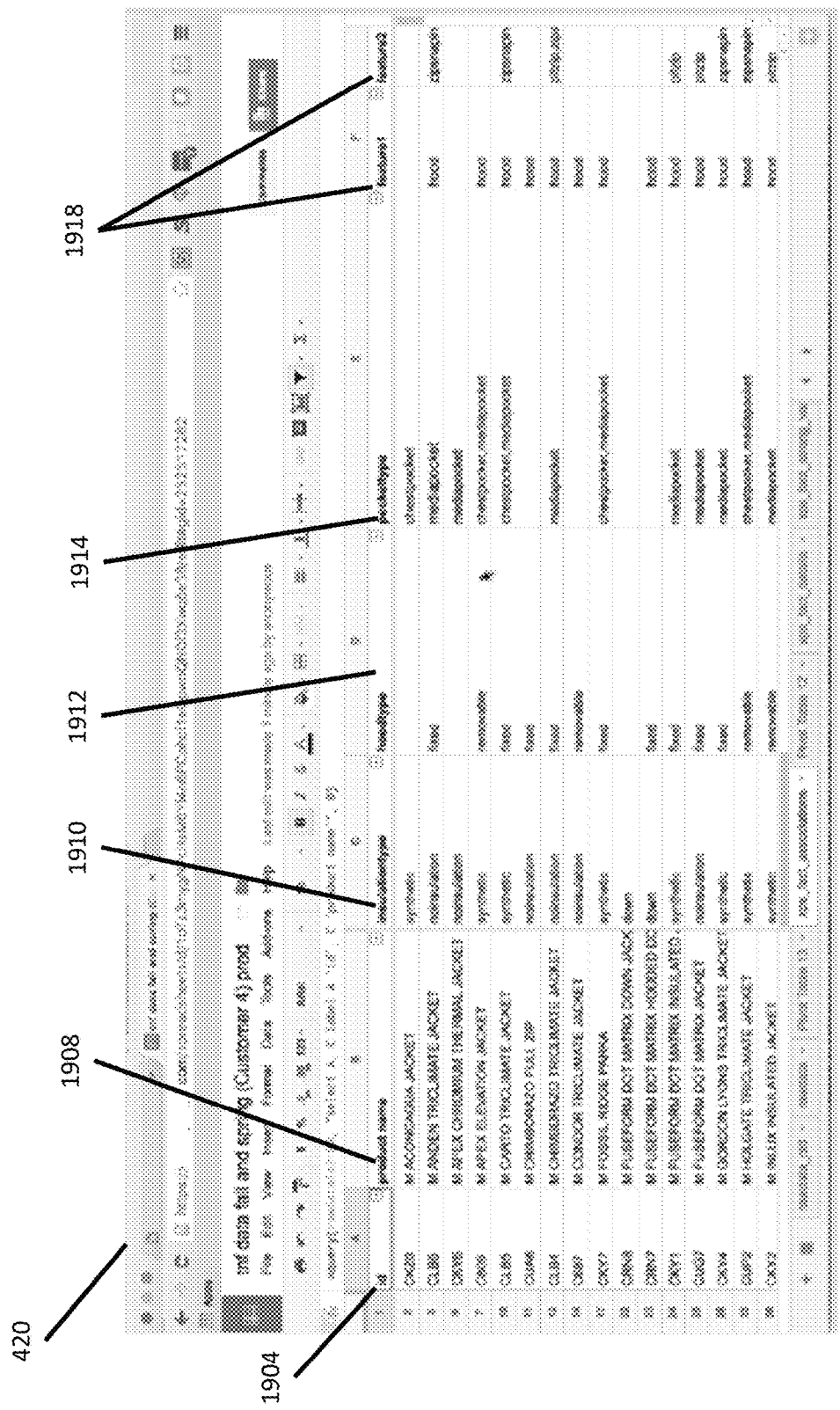
FIG. 19 shows an embodiment of a spreadsheet where product data ingested from a customer product database is organized for consumption by the graph database and other runtime components.

FIG. 19 shows an embodiment of a spreadsheet 420 where product data ingested from a customer product database 422 is organized for consumption by the graph database 424 and other runtime components 414. The spreadsheet 420 contains product identifiers 1904, product names 1908, and various facts, such as, in this exemplary embodiment involving a jacket, certain product feature and benefits, such as the type of insulation 1910, the type of hood 1912, the type of pocket 1914, and other features 1918. Each feature or benefit comprises a fact that can be stored in the graph database 424, so that the proximity of a given set of facts to each product can be determined based on the extent of the "heat" of that set of facts in relationship to the position of the product in the graph.

Figure 20:
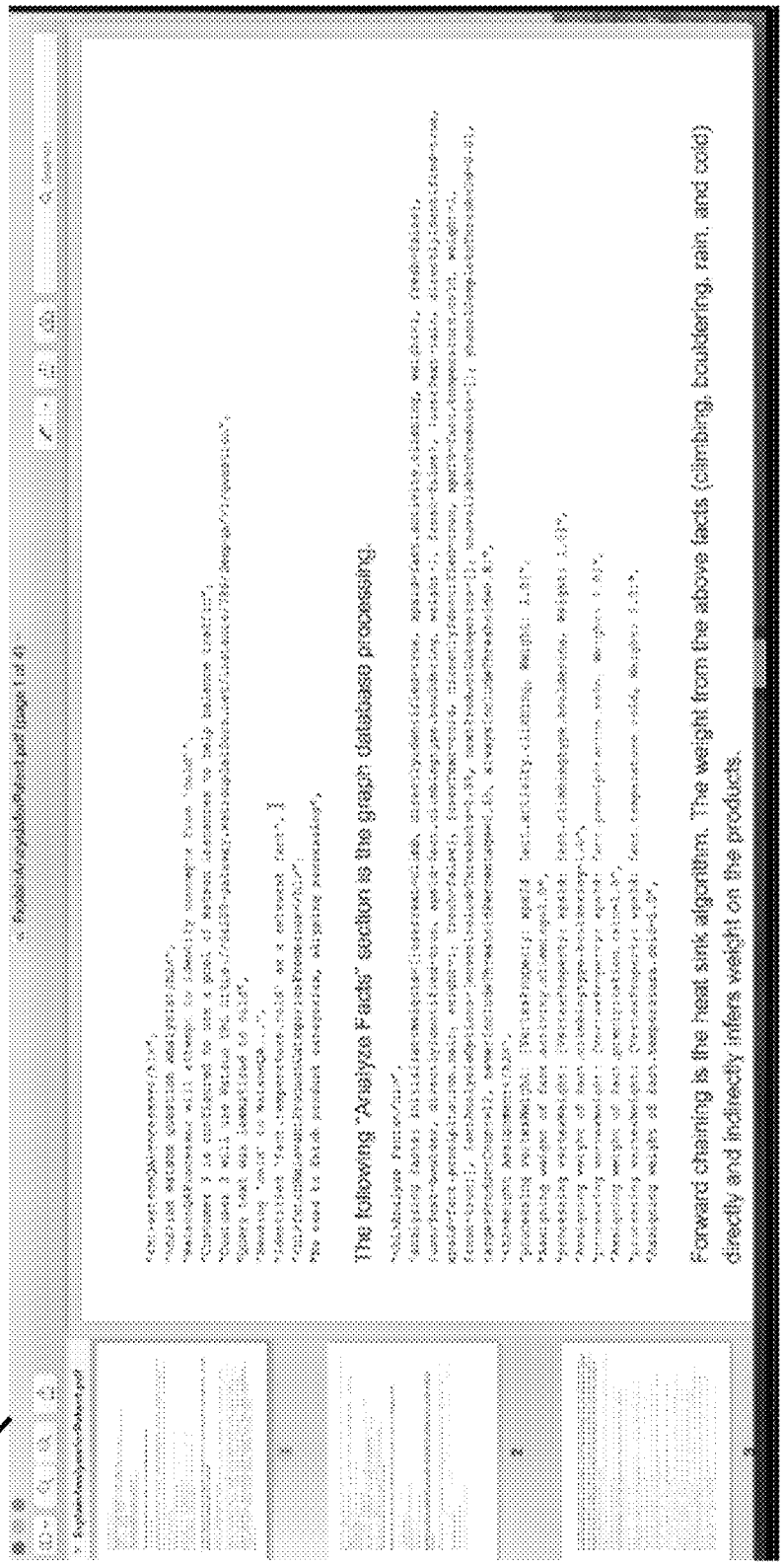
FIG. 20 shows an embodiment of graph database processing, in this case undertaking a process for analyzing a series of facts, including processing vertex weights for each of a series of facts to arrive at weights for products that potentially correspond to the facts.

FIG. 20 shows an embodiment of graph database processing 2002, in this case undertaking a process for analyzing a series of facts, including processing vertex weights for each of a series of facts to arrive at weights for products that potentially correspond to the facts.

In embodiments, methods and systems disclosed herein may use parallel processing techniques, such as sharding, to main performance as the number of possible facts applicable to a product line increases, such as for more complex or larger product sets. In embodiments, data may be pre-cached, or the platform may use multiple database instances that allow the controlling logic to be divided up to maintain performance.

One challenge is that the numerical calculations, where the system aggregates weights and infers them, in some cases are isolated to the specific request. For example, weights for one dialog about skis should not interfere with another dialog about hiking jackets, even if they are with respect to the products of the same merchant in the same graph database 424. In embodiments, the graph database 424 may implement strategies that intercept calls to the database 424 and allow processing of the calls in a distinct, domain-specific way, such that results are filtered to respond only to a particular dialog session. These may include using "thread local" data storage in Java™, so that filters are done in memory.

In embodiments, the query processing framework described above aggregates multiple services together with flexible sequencing where things can run in parallel, or before or after other tasks to facilitate integration with multiple third party services: such as the graph database, NLP processing, services indicating weather, and others. The framework gets responses from external services and aggregates the responses. In embodiments, queries are configured, such as using .json files as described above, and a question analysis facility is used as a parser. As a result, different services can all contribute to a single query, such as weather, calendar events of a person, a consumer profile (e.g., favorite colors), or other elements that could improve the quality of a product recommendation.

In embodiments, recommendations may also use collaborative filtering and may accumulate a user's interactions with the system and use that data to inform recommendations in future dialog sessions.

Figure 21:
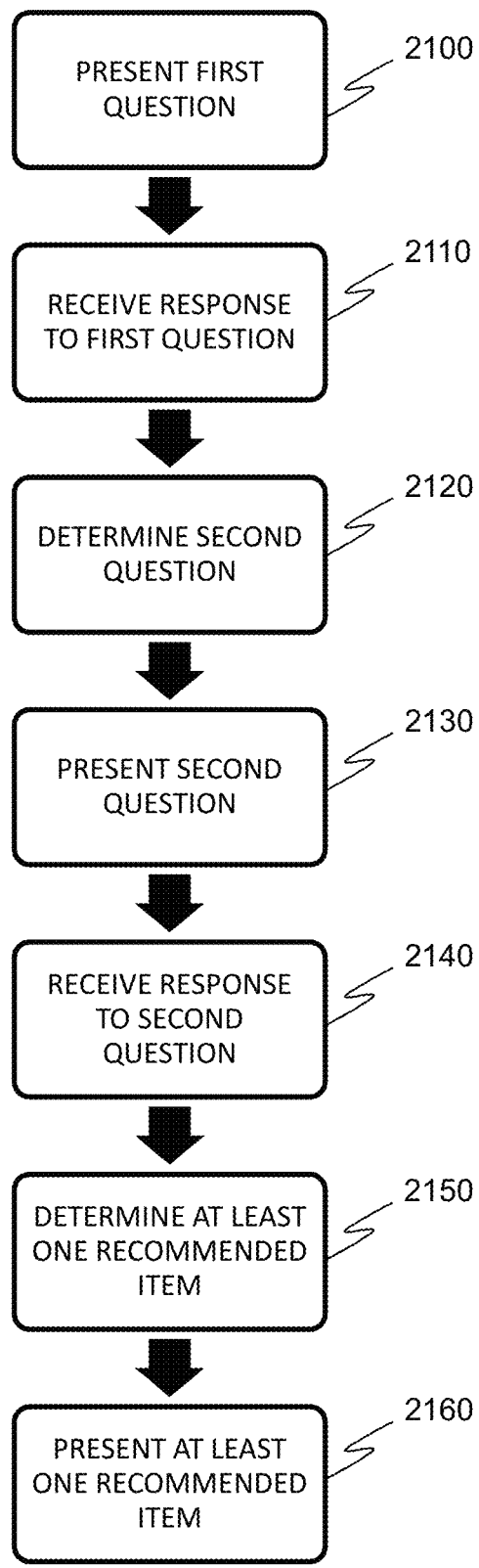
FIG. 21 shows a flowchart of a method in accordance with aspects of the invention.

FIG. 21 shows a flowchart of a method in accordance with aspects of the invention. At step 2100, the system presents a first question to a user via a user interface. For example, as described above with respect to FIG. 7, in cases where the merchant offers a single category of product, the dialog may begin with a question that is helpful in narrowing down within that category (such as "where and when will you be using this jacket?" in the case of an exemplary embodiment involving a merchant that provides hiking jackets). The user interface for the dialog may provide examples that help prompt the user as to how to answer the question and may include a mechanism allowing the user to submit the answer for further processing. At step 2110, the system receives a response to the first question from a user via the user interface.

At step 2120, the system determines a second question using the received response to the first question and a weighted collection of attributes corresponding to a plurality of items. For example, as described above with respect to FIG. 8, a follow-up question may be presented in the dialog box 702. The questions may be presented based on the activities of the runtime components 414 of the XPS servers 412. As seen in the server log 802, when the dialog starts, the platform 400 may lack information that would be valuable, such as the nature of the product category. The platform 400 may, for example, determine scores that relate to various available facts (here labeled "factfamily" in this embodiment) that could help identify a relevant product. A score can be determined for each fact family, such as ones based on gender, precipitation, insulation type, benefits, wind conditions, and the like, where a higher score (in this case on a normalized scale from zero to one), indicates the extent to which knowing a fact will help improve a product recommendation. For example, in the log 802 it can be seen that the fact family related to gender has a score of 0.99, resulting in determining that the next question should ask a question that prompts indication of a gender, such as "is this jacket for a man or a woman?"

At step 2130, the system presents the determined second question to the user via the user interface. At step 2140, the system receives a response to the second question from the user via the user interface.

At step 2150, the system determines at least one recommended item from the plurality of items based on the response to the first question, the response to the second question, and the weighted collection of attributes corresponding to the plurality of items. At step 2160, the system presents the determined at least one recommended item to the user via the user interface. For example, as described above with respect to FIG. 10, potentially relevant products may be displayed, such as in a product display pane 1004. Thresholds may be set in the platform 400 which are used to determine whether there is enough confidence in a match to a particular product to begin to show potentially matching products (which may be presented in order of relevance based on facts known at a particular point in the dialog).

In embodiments, the platform 400 may be embodied using object-oriented programming logic, such as Javascript™, with suitable classes and methods to enable the capabilities described herein. The platform may expose an API (such as "XPS-business-logic") that a user interface layer can call to get data and the state it requires in order to render, which may include customer identifiers, the name of the computing environment where the platform will be staged in a particular implementation, API key information for a customer/environment, and the location of a host computer (such as in URL format).

Various methods may be employed, such a clearState( ) method that clears the state of a query response to start a new session, an encodeSession(cb) method that encodes a current session, including a current set of products (which may return a base64 encoding of the current session and may include identifiers and weights of currently recommended products, and a getActivePhase( ) method that gets the currently active phase in a multi-phase category of questioning and returns a string indicating the currently active phase. Other methods in the system can get other data, such as a getActiveProductCategory( ) method that returns a string indicating the currently active product category and a getAllProducts( ) method that can fetch all products from the server, optionally with relevant detail and optionally using the cache. A getFollowupQuestions( ) {array} method can get an array of followup questions as a result of querying the XPS servers 412. The method can return an array of followup questions converted into Javascript objects. A getMessagesData( ) (array) method can get an array of messages for use by the user interface. The method returns an array of objects, each of which has at least a messageCode property that defines the message. A getNegativeRelevantFacts( ) {array} method can get an array of negative relevant facts returned via a query of the XPS servers 412. The method can return an array of negated relevant facts converted to plain Javascript objects. A getNextProductCategories( ) {array} can get the product categories that come after the active product category, returning an array of the next product categories. A getNoopTerms( ) {array} method can get an array of noopTerms that were identified as a result of querying the XPS server 412. The method returns an array of noopTerms that have been identified within the current session, with fresh terms listed first. A getPercentComplete ( ) {float} method can get a percent complete value, as a floating number between 0.0 and 1.0. The percentComplete represents how much the platform 400 knows about the users' needs to be able to stop asking followup questions. It increases from 0 toward 1 as the session progresses. When it reaches 1, the platform 100 considers it to be a good state for the user interface to stop asking followup questions. The method returns a percent complete value between 0.0 and 1.0. A getPhaseComplete( ) {float} method gets a phase percent complete value, as a float between 0.0 and 1.0. The phaseComplete represents how much platform 400 knows about the users' needs with respect to the current phase of questioning. This allows the platform 400 to be able to determine when to transition to the next phase. It increases from 0 to 1 as a phase progresses. The method returns a phase complete value between 0.0 and 1.0. A getProductCategories( ) {array} method gets selected product categories, returning an array that represents a collection of currently selected product categories with their status (e.g., "todo," "active," or "done"). A getQueryResponse( ) {queryResponse} method gets the entire response object that includes its attributes. A getQueryText( ) {string} method gets the original text that was entered by the user in the user interface of the platform. A getRecommendedProducts( ) {array} method gets an array of recommended products returned as a result of querying the XPS servers 412. The method returns an array of recommended products converted to plain Javascript objects. A getRelevantFacts( ) {array} method gets an array of relevant facts returned as a result of querying the XPS servers 412, returning an array of relevant facts converted to plain Javascript objects. A getRemovedFacts( ) {array} method gets an array of removed facts returned as a result of querying the XPS servers 412, returning an array of removed relevant facts converted to plain Javascript objects. A getSupportingDocuments( ) {array} method gets an array of supporting documents returned as a result of querying the XPS server 112, returning the array converted to plain JavaScript objects. A getWeather( ) {object} method gets an object of weather data. An omitFollowupQuestions(xpsID) {array} method stores an identifier to omit from future followup question suggestions. A recordAnalyticsEvent(eventType, eventData) method triggers events and records the event data with an analytics service, where the eventType is a string that indicates the type of the event being recorded and the eventData is an object that has data related to the event that needs to be recorded. A removeRelevantFact (Array, callback) method removes a fact from the relevant fact list by setting its weight to 0.0. The Array is an array of strings of identifiers of the facts to be removed. The callback is a queryReponseCallback function that accepts errors and queryResponse parameters. A resubmitEncodedSession(encodedSession, cb) method restores a session that was previously encoded and sends a submitQuery request using restored query parameters, where encodedSession is an object with the encoded session with a browser session state and product listings and cb is a callback function that accepts error and queryResponse parameters. A sendEmail (senderinfo, callback) method sends an email to a recipient with the current session. The current session may be base64 encoded. The request may sent to the /sendEmail endpoint on the XPS server 112. Prior to using this endpoint, the last query response must have returned a recommended product set. The senderinfo object is an object with the sender's information and may contain values for the senderName and the name of the recipient. The callback is a function to call once done. A setActiveProductCategory (activeCat) method sets the active product category, where activeCat is a string that describes the currently active product category. A setProductCategories (array) method sets the selected product categories, where the array is an array of product category objects to be set as selected. A setProductCategoryStrings (array) method sets the selected product categories using an array of strings. A setUnvailableProducts (xpsIDs, callback) method save the list of unavailable products for a given session. When submitQuery is called, the list of unavailable products will be sent as a parameter to the XPS server 412. Calling the clearState method will clear the unavailable product array in the browser session. A submitPreviousQuery(callback) method resubmits the last query that was submitted to submitQuery( ). The previous query is stored in sessionStore so that this method can be used to resume where the user left off if the user returns later in a browsing session. Note that if there is no previous query stored, this function returns that error via the callback, rather than throwing an exception, since the caller may not be able to tell whether or not there should be a previous query. A submitQuery(queryParams, callback) method takes in query parameters (queryParams) and calls the XPS servers 412 to fetch results and store them in the queryResponse object. It then invokes the callback method passing the response object as an argument to it. Query parameters can include query text, relevant facts, negative relevant facts, used followup questions, content to include, thresholds (such as always include thresholds and never include thresholds), target product count, phase completion thresholds and save state parameters. The callback function accepts errors and queryResponse parameters.

The methods and systems may also include and use code objects of various types, which may be defined by type definitions. These type definitions include error objects that provide a message that gives a textual explanation of an error. Type definitions also include followupQuestion object types, where the platform 400 presents followup questions to the consumer in order to dialog with the consumers for the purposes of providing a better product recommendation. Each followup question is presented as a fact family that contains a collection of facts. The fact family can be presented as a single question with each fact inside it being a potential answer. Alternatively, each fact can be presented as a yes/no question. The user interface will determine how to present the followup questions to the consumer. The followupQuestion object type has a number of properties, including the platform identifier of a fact family, and the score of the followup question to indicate its importance. In embodiments these scores are not normalized. Within a single collection of followup questions, the highest score means that the platform 400 will most improve the quality of its product recommendations if that question is answered. The properties may include an askFactQuestion property, which is a Boolean object indicating whether or not it makes more sense to act about facts within the fact family. The properties may include a facts property, which is an array of facts in the fact family, where each fact may have an identifier (a string), a score (a number that indicates the impact the fact would have on the platform's product recommendations, and a weight (which is non-zero if that fact has been identified as a relevant fact). It is possible for a followup question to include a fact that has already been identified but with a low weight. The properties may also include a label (a string) that the client user interface can use to represent facts.

The type definitions may also include a negativeRelevantFact object. Negative relevant facts are data elements that help the platform 400 exclude facets from product recommendations. Negated facts are parsed from a natural language query during a dialog session. For example, the negative relevant fact "activity:hiking" might be parsed from the query "I am not interested in a hiking jacket." The type definition may have properties such as a unique identifier for the fact in the platform 400, a weight reflecting the importance of the fact in the product recommendation process. In embodiments, the weight may be set to −1 for a negated fact. The properties may include a directlyIdentified property, a Boolean type object, where facts that are parsed from the natural language query and those that are directly solicited by the platform 100 are considered to be "directlyIdentified". This is in contrast to facts that are derived from the directly identified ones, which therefore are not directly identified.

The type definitions may include a noopTerm object type. A noop term is returned if the query processor recognizes a term in the query, but does not have any product or recommendation to return for it. Properties of the type can include an identifier in the platform 400 and a fresh property (Boolean) that is true if the noop term was identified in the last query. Since noop terms are saved in the session, there may be many saved noop terms that are not fresh. A label property (a string) is a label that the client user interface can use to express noop terms. A description property (also a string) may include longer text that explains why the term was recognized, yet returned no recommendations.

The type definitions may include a product object type. A product is an item that an implementing merchant sells. This represents a product that is stored in the content store of the platform 400. It optionally contains a content block when the content is explicitly requested via an API function. In addition to a document identifier in a repository of the platform 400, the object type may include a content property, an object that is a map of product properties to detailed information about the product. This may include the type of the document (i.e., "product"), a document identifier, an indicator of the source of the document, a name of the product, a description of the product, a set of styles available for the product, URL(s) for the product and for images of the product, identifiers for the product (e.g., name and value), and other properties of the product, including freeform properties of the product (each of which may have a name and a value).

The type definitions may include a queryResponse object type. Properties may include a recommendedProducts property (an array of the current set of products that have been retrieved from the XPS servers 412), a followupQuestions property (an array of the current set of questions), a relevantFacts property (an array of relevant facts that have been identified and/or inferred), a negativeRelevantFacts property (an array of the set of negative facts that have been identified and inferred), a removedFacts property (an array of facts that have been removed from the current session), a supportingDocs property (an array of current supporting documents retrieved from the servers 412), and a noopTerms property (an array of the current set of noopTerms that have been identified by the servers 412).

The type definitions may include a queryResponseCallback (err, queryResponse) type, with properties that include an error property and a queryResponse property that includes data retrieved from the server.

The type definitions may include a recommendedProduct object type. A recommended product is an item that a company sells. One of the main objectives of the platform 400 is to provide product recommendations. Accordingly, the platform 400 stores and presents product data to consumers. All the optional properties are included if the product content is explicitly requested in the 'submitQuery' function call. Properties may include an identifier for the product in the platform, a weight (a number) indicating the confidence with which the product is presented to the consumer, and an array of associated facts that are directly associated with the product and that contributed to its confidence score (and the associated facts can have properties such as an identifier for each fact in the platform, an inferWeight property indicating the amount of impact the fact has on the product, a label for the fact that can be used by the user interface, and a negative property (Boolean) that can be set to "True" when a fact has negatively impacted the product's confidence score. Properties of the recommendedProduct object type can also include the type of the document (i.e, "product"), a document identifier, a document source, a name, a description, a style, URL(s) for the product and images for the product, identifiers for the product (including strings for names and values) and properties for the product (each with name and value).

The type definitions may include a relevantFact object type. Relevant facts are data elements that help the platform 400 make product recommendations. The platform 400 may work with at least three types of relevant facts in embodiments. First, there are relevant facts that are parsed from a natural language query. For example, the relevant facts "precipitation:rainy" and "category:jacket" might be parsed from the query "I am looking for a jacket to use in a rainy place." Second, there are relevant facts that are derived from those parsed from a query. In the above example, the platform 400 might derive the facts "benefit:waterproof" or "technology:hyvent" from the fact "precipitation:rainy". Third, there are relevant facts that are solicited by the platform 400 in the dialoging process. For example, the platform 400 might ask the consumers "Are you looking for a men's or women's jacket" in order to obtain the fact "gender:men" or the fact "gender:women." Properties of the relevantFact object type may include an identifier within the platform for each fact, a weight (a number indicating the importance of this fact in the product recommendation process, which may be a normalized value between 0 and 1), and a directlyIdentified property (Boolean). Facts that are parsed from the natural language query and those that are directly solicited by the platform 400 can be considered to be "directlyIdentified". Facts that are derived from the directly identified ones are not considered to be directly identified. Properties may include a properties object for storing miscellaneous properties for a defined fact. Properties may include an acknowledgmentText property (string) of text associated with the fact. This provides a more conversational way for a user interface to acknowledge that a fact is understood by XPS. This text will typically be helpful for facts that have their 'fresh' property set to true, i.e., facts identified in the recent-most query. Properties may include a fresh property (Boolean) which may include a flag to represent if a fact is identified in the recent most query. If it is, the flag is true. Otherwise, it is false.

The type definitions may include a removedFact object type. Removed facts are data elements that the platform 400 will not use to influence product recommendations. These facts can be submitted to the platform 400 using the removeRelevantFacts API method described above. Properties may include an identifier, a weight, and whether the removed fact is directly identified (i.e, not inferred).

The type definitions may include a supportingDoc object type. Supporting documents are unstructured web pages that contain content relevant to the platform 400. Examples are blogs, articles, expert reviews, and buying guides. This content is presented in the platform 400 to help consumers reach a level of confidence in their purchase that they will pull the trigger. Properties may include an identifier in a repository of the platform 400, a document type, a weight (such as indicating confidence with which a supporting document is presented to a customer), a name of the document, a document source, a title, a location, an author, a category (e.g., "blog," "review," "video," or the like) and/or a content property (such as indicating relevant sections from an original reference document, such as stored as HTML, mark-up language, or the like.

The type definitions may include a weather object type. Weather data may be returned if the user specifies a location (and optionally a time) during a dialog response. Facts extracted from the weather, such as snow or extreme heat, may be used to inform product recommendations. The weather data collected and used by the platform 400 may be available from the weather API. Properties may include location, date, and weather properties. Weather properties may include a summary, a precipitation type, an intensity of precipitation, a low temperature, a high temperature, a wind speed, and the like.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While only a few embodiments of the present disclosure have been shown and described, it is understood that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++ or Java, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a recommendation, the method comprising:

presenting, by a computer device, a first question via a user interface;

receiving, by the computer device, a response to the first question via the user interface;

generating, by the computer device, a second question using the received response to the first question and a highest weighted attribute in a weighted collection of attributes corresponding to a plurality of items offered by a merchant, wherein each attribute in the weighted collection of attributes relates to a feature or benefit of one of the plurality of items offered by the merchant, and the computer device generates the second question using backward chaining logic in a graph database;

presenting, by the computer device, the generated second question via the user interface;

receiving, by the computer device, a response to the second question via the user interface;

storing, by the computer device, the response to the first question and the response to the second question as a set of received responses;

generating, by the computer device, a subsequent question using the stored set of received responses and the weighted collection of attributes corresponding to the plurality of items offered by the merchant, wherein the computer device generates the subsequent question using backward chaining logic in the graph database;

receiving, by the computer device, documents and other training information used with machine learning by the computer device to generate the subsequent question;

presenting, by the computer device, the subsequent question via the user interface;

receiving, by the computer device, a response to the subsequent question via the user interface;

adding, by the computer device, the response to the subsequent question to the set of received responses;

repeating the determining the subsequent question, the presenting the subsequent question, the receiving the response to the subsequent question, and the adding the response to the subsequent question until a confidence score for purchasing one or more items of the plurality of items offered by the merchant meets a predetermined threshold;

determining, by the computer device, at least one recommended item from the plurality of items offered by the merchant based on the stored set of received responses and the weighted collection of attributes corresponding to the plurality of items offered by the merchant; and presenting, by the computer device, the determined at least one recommended item via the user interface, wherein the one or more items of the plurality of items offered by the merchant having the confidence score that meets the predetermined threshold is determined to be the at least one recommended item, and the confidence score is based on an edge weighting factor within the graph database, the edge weighting factor being a measure of how many facts are known about each of the one or more items versus how many facts are available for items in an item category to which the one or more items belong.

2. The method of claim 1, further comprising:

dividing, by the computer device, the weighted collection of attributes into a plurality of attribute groups; and determining, by the computer device, an attribute group score for each of the plurality of attribute groups based on a degree to which receiving additional information regarding the attribute group increases a confidence score for at least one of the plurality of items offered by the merchant, and wherein the generating the second question further comprises using the determined attribute group score for each of the plurality of attribute groups.

3. The method of claim 1, wherein the generating the subsequent question further comprises determining an attribute from the weighted collection of attributes corresponding to a highest expected improvement in the confidence score and further using the determined attribute to determine the subsequent question.

4. The method of claim 1, wherein the presenting the determined at least one recommended item comprises presenting the at least one recommended item in an order based on the confidence score.

5. The method of claim 1, wherein:
the user interface is a web page, and
the response to the first question and the response to the second question are unstructured text.

6. The method according to claim 1, further comprising:
determining, by the computer device, a plurality of items of additional information that are currently unknown but if known would increase the confidence score indicating a quality of a match for at least one of the plurality of items offered by the merchant;
for each of the plurality of items of additional information, the computer device determining an impact of knowing the item of additional information on the confidence score;
assigning, by the computer device, weights to each of a plurality of unknown attributes in the weighted collection of attributes based on the impacts of knowing each of the plurality of items of additional information; and
generating, by the computer device, the subsequent question by iterating through each of the unknown attributes in the weighted collection of attributes to determine a highest weighted unknown attribute.

7. The method of claim 1, wherein the computer device determines the at least one recommended item using a heat sink algorithm.

8. The method of claim 1, further comprising identifying, by the computer device, unknown facts and, for each one of the unknown facts, determining an extent to which, if known, each of the unknown facts would impact the determining the at least one recommended item.

9. The method of claim 1, wherein the computer device uses forward chaining logic to determine the at least one recommended item.

10. The method of claim 9, wherein the computer device performs the forward chaining logic and the backward chaining logic in real time while a user is interacting with the user interface.

11. The method of claim 1, wherein the graph database includes a set of product data for the plurality of items offered by the merchant that is stored in graph format, and the graph database uses graph structures for semantic queries with nodes, edges and properties that represent the plurality of items offered by the merchant.

12. A computer program product comprising a computer readable storage medium having program instructions embodied therewith, the program instructions executable by a computer device to cause the computer device to:
divide a weighted collection of attributes into a plurality of attribute groups, wherein each attribute in the weighted collection of attributes relates to a feature or benefit of one of a plurality of items offered by a merchant;
present, via a user interface, a first question;
receive, via the user interface, a response to the first question;
determine a confidence score for purchasing each of the plurality of items offered by the merchant based on the received response to the first question and the weighted collection of attributes;
determine an attribute group score for each of the plurality of attribute groups based on a degree to which receiving additional information regarding the attribute group increases the confidence score for at least one of the plurality of items offered by the merchant;
generate a subsequent question using an attribute group having a highest attribute group score of the determined attribute group scores, wherein the subsequent question is generated using backward chaining logic in a graph database;
receive documents and other training information used with machine learning to generate the subsequent question;
present, via the user interface, the determined subsequent question;
receive, via the user interface, a response to the subsequent question;
update the confidence score for each of the plurality of items offered by the merchant based on the received response to the subsequent question and the weighted collection of attributes; and
repeat the determining the attribute group score, the generating the subsequent question, the presenting the subsequent question, the receiving the response to the subsequent question, and the updating the confidence score until a confidence score for one or more items of the plurality of items offered by the merchant meets a predetermined threshold,
wherein the confidence score is based on an edge weighting factor within the graph database, the edge weighting factor being a measure of how many facts are known about each of the plurality of items versus how many facts are available for items in an item category to which each of the plurality of items belongs.

13. The computer program product according to claim 12, the program instructions further causing the computer device to:
present, via the user interface, at least one recommended item selected from the plurality of items offered by the merchant based on the confidence score for each of the at least one recommended item.

14. The computer program product according to claim 12, the program instructions further causing the computer device to:
present, via the user interface, at least one recommended item selected from the plurality of items offered by the merchant based on the confidence score for each of the at least one recommended item.

15. The computer program product according to claim 14, wherein each item of the plurality of items offered by the merchant having a confidence score that meets a first predetermined threshold is selected as the at least one recommended item.

16. The computer program product according to claim 15, wherein the presenting the at least one recommended item further comprises displaying an indicator that identifies one or more of the at least one recommended item having a confidence score that meets a second predetermined threshold that is higher than the first predetermined threshold.

17. The computer program product according to claim 14, wherein a predetermined number of items having highest confidence scores among the plurality of items offered by the merchant are selected as the at least one recommended item.

18. The computer program product according to claim 12, wherein the user interface is a web page.

19. A system, comprising:
a hardware processor, a computer readable memory, and a computer readable storage medium associated with a computer device;
program instructions of a divider configured to divide a weighted collection of attributes into a plurality of attribute groups, wherein each attribute in the weighted collection of attributes relates to a feature or benefit of one of a plurality of items offered by a remote provider;

program instructions of a first question presenter configured to present, via a user interface, a first question;

program instructions of a first response receiver configured to receive, via the user interface, a response to the first question presented by the first question presenter;

program instructions of a question analysis facility configured to parse the response to the first question ;

program instructions of a confidence score determiner configured to determine a confidence score for selecting each of the plurality of items offered by the remote provider based on the parsed response to the first question received by the first response receiver and the weighted collection of attributes;

program instructions of an attribute group score determiner configured to determine an attribute group score for each of the plurality of attribute groups based on a degree to which receiving additional information regarding the attribute group increases the confidence score for at least one of the plurality of items offered by the remote provider;

program instructions of a subsequent question generator configured to generate a subsequent question using an attribute group having a highest attribute group score of the attribute group scores determined by the attribute group score determiner;

program instructions of the subsequent question generator configured to receive documents and other training information used with machine learning to generate the subsequent question;

program instructions of a subsequent question presenter configured to present, via the user interface, the subsequent question;

wherein the program instructions are stored on the computer readable storage medium for execution by the hardware processor via the computer readable memory.

20. The system according to claim 19, further comprising program instructions of a recommended item presenter configured to present, via the user interface, at least one recommended item selected from the plurality of items offered by the remote provider based on the confidence score for each of the at least one recommended item determined by the confidence score determiner.

* * * * *